(12) United States Patent
Barroso et al.

(10) Patent No.: US 6,636,949 B2
(45) Date of Patent: Oct. 21, 2003

(54) SYSTEM FOR HANDLING COHERENCE PROTOCOL RACES IN A SCALABLE SHARED MEMORY SYSTEM BASED ON CHIP MULTIPROCESSING

(75) Inventors: Luiz A. Barroso, Mountain View, CA (US); Kourosh Gharachorloo, Menlo Park, CA (US); Andreas Nowatzyk, San Jose, CA (US); Robert J. Stets, Palo Alto, CA (US); Mosur K. Ravishankar, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 116 days.

(21) Appl. No.: 10/042,008

(22) Filed: Jan. 7, 2002

(65) Prior Publication Data

US 2002/0129208 A1 Sep. 12, 2002

Related U.S. Application Data

(63) Continuation-in-part of application No. 09/878,982, filed on Jun. 11, 2001.
(60) Provisional application No. 60/210,675, filed on Jun. 10, 2000.

(51) Int. Cl.[7] .............................................. G06F 12/00
(52) U.S. Cl. ............................. 711/141; 707/8; 707/10; 707/201; 709/101; 709/213; 711/151; 711/152
(58) Field of Search .............................. 707/8, 10, 201; 709/101, 248, 213; 711/141, 151, 152

(56) References Cited

U.S. PATENT DOCUMENTS

| | | | | |
|---|---|---|---|---|
| 5,892,970 A | * | 4/1999 | Hagersten ...................... 710/5 |
| 6,055,605 A | * | 4/2000 | Sharma et al. .............. 711/130 |
| 6,457,100 B1 | * | 9/2002 | Ignatowski et al. ......... 711/119 |
| 2001/0052054 A1 | * | 12/2001 | Franke et al. ................ 711/147 |
| 2002/0178210 A1 | * | 11/2002 | Khare et al. ................. 709/107 |
| 2003/0079085 A1 | * | 4/2003 | Ang ........................... 711/122 |

* cited by examiner

*Primary Examiner*—Donald Sparks
*Assistant Examiner*—C. P. Chace

(57) ABSTRACT

In a chip multiprocessor system, the coherence protocol is split into two cooperating protocols implemented by different hardware modules. One protocol is responsible for cache coherence management within the chip, and is implemented by a second-level cache controller. The other protocol is responsible for cache coherence management across chip multiprocessor nodes, and is implemented by separate cache coherence protocol engines. The cache controller and the protocol engine within each node communicate and synchronize memory transactions involving multiple nodes to maintain cache coherence within and across the nodes. The present invention addresses race conditions that arise during this communication and synchronization.

41 Claims, 22 Drawing Sheets

Virtual Address Bits Used for Indexing the L1
Cache and the Dtags in the L2 Cache Possible Synonym Locations in the L2 Dtags Microcode Instruction Format TSRF entry format L2 cache controller 116

Direct the protocol engine to abort the stale request. — 678

Direct the L1 cache to abort the stale request — 680

Remove the entry from the pending tx buffer — 682

. . .

Receive a response to a request from a protocol engine — 694

Update the state of the memory line — 696

Send a response to the L1 cache — 698

Remove the entry from the pending tx buffer — 699

Figure 14C

SYSTEM FOR HANDLING COHERENCE PROTOCOL RACES IN A SCALABLE SHARED MEMORY SYSTEM BASED ON CHIP MULTIPROCESSING

This application is a continuation-in-part of U.S. patent application Ser. No. 09/878,982, filed Jun. 11, 2001, Scalable Multiprocessor System And Cache Coherence Method, serial number, which claimed priority on U.S. provisional patent application serial No. 60/210,675, filed Jun. 10, 2000.

RELATED APPLICATIONS

This application is related to, and hereby incorporates by reference, the following U.S. patent applications:

Multiprocessor Cache Coherence System And Method in Which Processor Nodes And Input/output Nodes Are Equal Participants, Ser. No. 09/878,984, filed Jun. 11, 2001;

Scalable Multiprocessor System And Cache Coherence Method, Ser. No. 09/878,982, filed Jun. 11, 2001;

System and Method for Daisy Chaining Cache Invalidation Requests in a Shared-memory Multiprocessor System, Ser. No. 09/878,985, filed Jun. 11, 2001;

Cache Coherence Protocol Engine And Method For Processing Memory Transaction in Distinct Address Subsets During Interleaved Time Periods in a Multiprocessor System, Ser. No. 09/878,983, filed Jun. 11, 2001;

System And Method For Generating Cache Coherence Directory Entries And Error Correction Codes in a Multiprocessor System, Ser. No. 09/972,477, filed Oct. 5, 2001, which claims priority on U.S. provisional patent application 60/238,330, filed Oct. 5, 2000, which is also hereby incorporated by reference in its entirety.

FIELD OF INVENTION

The present invention relates generally to the design of cache memories in computer central processor units (CPU's), and particularly to the detection and resolution of coherence protocol races within a chip multiprocessor node (i.e., a chip with multiple CPU's).

BACKGROUND OF THE INVENTION

In chip multiprocessor systems, it is advantageous to split the coherence protocol into two cooperating protocols implemented by different hardware modules. One protocol is responsible for cache coherence management within the chip, and is typically implemented by the second-level cache controller ("cache controller"). The other protocol is responsible for cache coherence management across chip multiprocessor nodes ("nodes"), and is typically implemented by separate cache coherence protocol engines ("protocol engines"). The cache controller and the protocol engine need to communicate and synchronize memory transactions involving multiple nodes. In particular, there must be a single serialization point within each node that resolves races within the node. Specifically, the serialization point must address situations in which the protocol engine and the cache controller overlap in their respective processing of memory transactions concerning the same memory line of information.

SUMMARY OF THE INVENTION

This invention relates to the design of cache coherence protocol for a scalable shared memory system composed of chip multiprocessor nodes, that is, each processor chip contains multiple CPUs, each CPU with its own private instruction and data caches (first-level caches) and all CPUs sharing a single second-level cache. Cache coherence is maintained among all caches within a chip, as well among all caches across the nodes by a protocol engine and a cache controller that are included in each node of the system. The protocol engine and the cache controller often interact to complete each of these tasks. If messages exchanged between the protocol engine and the cache controller concerning a particular cache line overlap, the protocol engine requests additional processing instructions from the cache controller and stall action on the message received from the cache controller until after receiving the additional processing instructions from the cache controller. The protocol engine is further configured to stall action on messages concerning the same cache line and received from other nodes until after receiving the processing instructions from the cache controller.

BRIEF DESCRIPTION OF THE DRAWINGS

Additional objects and features of the invention will be more readily apparent from the following detailed description and appended claims when taken in conjunction with the drawings, in which:

FIGS. 14A, 14B and 14C illustrate processing steps a second-level cache controller uses in a preferred embodiment of the present invention to communicate with a protocol engine and an output buffer.

DESCRIPTION OF THE PREFERRED EMBODIMENTS

All specific quantities (such as numbers of processors, number of nodes, memory sizes, bit sizes of data structures, operating speeds of components, number of interfaces, number of memory locations in buffers, numbers of cache lines), as well as the sizes and number of components in various data structures, disclosed in this document, are provided solely for purposes of explaining the operation of one particular embodiment. These quantities will typically vary, sometimes significantly, from one implementation of the invention to another.

The following is a list of abbreviations frequently used in the descriptions below:
ECC: error correction code;
FSM: finite state machine;
ICS: intra-chip switch;
I/O: input/output;
L1 cache: first-level cache;
L2 cache: second-level cache;
MC: memory controller; and
PC: processor core.

Figure 1:
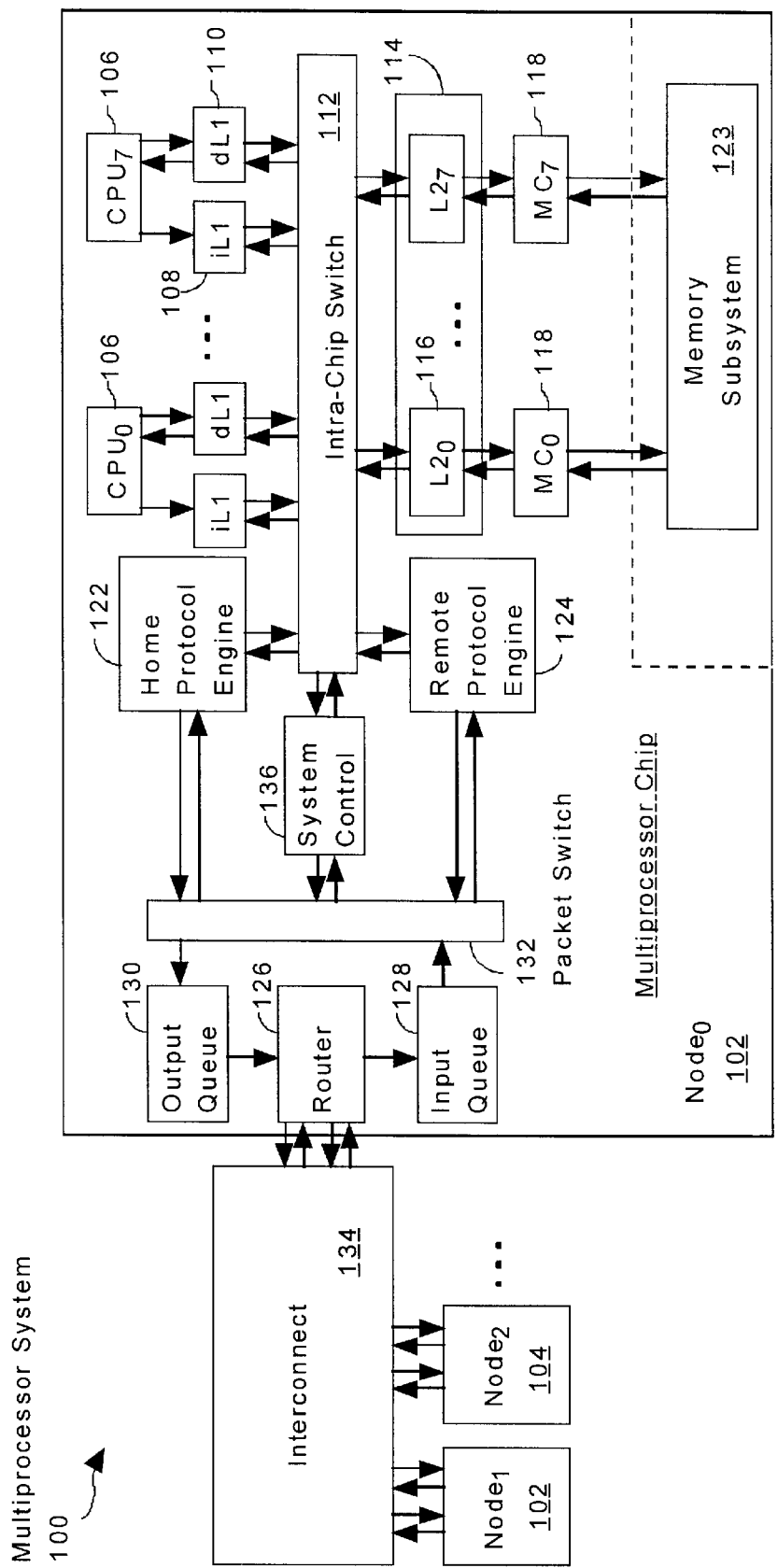
FIG. 1 is a block diagram of a multiprocessor system.

Referring to FIG. 1, there is shown a multiprocessor system 100 including a multiplicity of processor nodes 102 and input/output (I/O) nodes 104. Each processor node 102 is preferably implemented as a single chip multiprocessor. In a preferred embodiment, each processor node 102 has eight processor cores (PC) 106; however, other embodiments have two to sixteen PC's 106. The PC's 106, which may be comprised of a central processing unit, are processor cores since their caches, cache coherence logic and other supporting circuitry are shown separately.

Each processor core (PC) 106 is directly connected to dedicated instruction cache (iL1) 108 and data cache (dL1) 110 modules. These first-level caches (L1 cache modules) 108, 110 interface to other modules through an intra-chip switch (ICS) 112. Also connected to the ICS 112 is a logically shared second level cache (L2) 114 that is interleaved into eight separate modules 116, each with its own controller, on-chip tag, and data storage. Coupled to each L2 cache 116 is a memory controller (MC) 118 that preferably interfaces directly to a memory bank of dynamic random access memory (DRAM) chips (not shown) in a memory subsystem 123. In a preferred embodiment, each memory bank provides a bandwidth of 1.6 GB/sec, leading to an aggregate bandwidth of 12.8 GB/sec. Also connected to the ICS 112 are two protocol engines, the Home Protocol Engine 122 and the Remote Protocol Engine 124, which support shared memory across multiple nodes 102, 104 of the system. Multiple nodes are linked by a subsystem including a router 126, an input queue 128, an output queue 130, a packet switch 132, and an interconnect 134. The router 126 sends and receives packets to and from other nodes via the interconnect 134. The interconnect 134 physically links multiple nodes 102, 104. In a preferred embodiment the total interconnect bandwidth (in/out) for each node is 32 GB/sec. Finally, a system control module 136 takes care of miscellaneous maintenance-related functions (e.g., system configuration, initialization, interrupt distribution, exception handling, performance monitoring).

While the present invention is described in the context of a multi-processor, shared memory system, the present invention is also applicable to single processor computer systems.

Processor Core and First-Level Caches

In a preferred embodiment, each PC 106 uses a single-issue, in-order design capable of executing the Alpha instruction set. It consists of a 500 MHz pipelined datapath with hardware support for floating-point operations. The pipeline has 8 stages: instruction fetch, register-read, ALU 1 through 5, and write-back. The 5-stage ALU supports pipelined floating-point and multiply instructions. However, most instructions execute in a single cycle. The PC 106 includes several performance enhancing features including a branch target buffer, pre-compute logic for branch conditions, and a fully bypassed datapath. The PC 106 interfaces with separate first-level instruction and data caches designed for single-cycle latency.

As will be described in more detail below, the system uses 64 KB two-way set-associative, blocking caches with virtual indices and physical tags. The L1 cache modules 108, 110 include tag compare logic, instruction and data translation lookaside buffers (TLBs) and a store buffer (data cache only). The L1 cache modules 108, 110 also maintain a 2-bit state field per cache line, corresponding to the four states in a typical MESI protocol. For simplicity, the L1 instruction cache modules 108 and L1 data cache modules 110 use virtually the same design. Therefore, unlike other Alpha implementations, the instruction cache is kept coherent by hardware. Treating all cache modules 108, 110 in the same way also simplifies the implementation of a no-inclusion policy at the L2 level.

While a preferred embodiment is described with respect to a particular processor core, the present invention may be implemented using virtually any processor core or microprocessor.

Intra-Chip Switch

Figure 2:
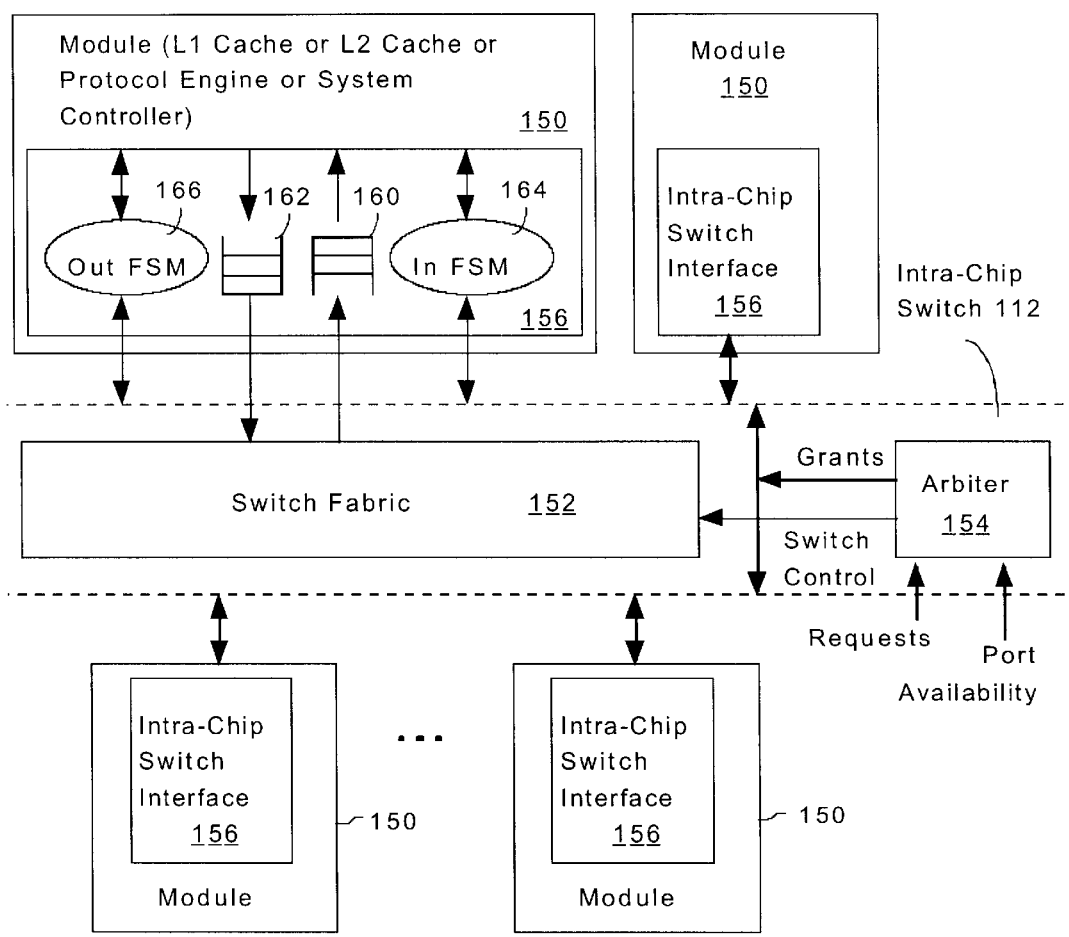
FIG. 2 is a block diagram of an intra-chip switch and the module interfaces used to couple the modules of a system node to the intra-chip switch.

Referring to FIG. 2, conceptually, the ICS 112 is a crossbar that inter-connects most of the modules 150 on a processor node 102 or I/O node 104. The ICS 112 includes a switch fabric 152 and an arbiter 154 for determining which data transfer(s) to handle during each available data transfer period. The length of the data period depends on the number of transfers required to send one cache line across the ICS 112. In a preferred embodiment, each connection provided by the switch fabric 152 of the ICS 112 has a path width of 64 data bits, plus eight parity bits, for a total of 72 bits. Each cache line transported through the ICS 112 has 512 bits of data and sixty-four parity bits. Memory lines are transported along with the corresponding sixty-four parity bits when they are transported through the ICS 112. Parity bits for memory lines are also sent to and used in the L1 cache arrays. However, parity bits are not used in the L2 cache and they are also not used in main memory. Instead, in the L2 cache, 20 error correction code (ECC) bits are associated with each memory line, and more specifically a 10-bit ECC is associated with each 256-bit half memory line. In the L2 cache and main memory, the 64 bits otherwise available for use as parity bits are used instead to store the 20 ECC bits, as well as a 44-bit directory entry, as described in more detail in related U.S. patent application Ser. No. 09/972,477, filed Oct. 5, 2001, System And Method For Generating Cache Coherence Directory Entries And Error Correction Codes in a Multiprocessor System. Data transfers generally are sent with a command or transaction type indicator, which is transferred in parallel with the first 64 bits of data of the cache line. Each cache line sized data transfer requires eight clock cycles, with 64 bits of data and a proportional share of the parity and ECC bits being transferred during each clock cycle.

Arbitration and flow control are handled by the arbiter 154. To better understand the arbiter it is helpful to first review the intra-chip switch interface 156 presented by each module 150 (i.e., L1 cache modules 108, 110, L2 cache, protocol engine or system controller) to the ICS 112. As shown in FIG. 2, the standard intra-chip switch interface 156 provided by each such module includes one or more input buffers 160, one or more output buffers 162, an input finite state machine (FSM) 164 for controlling use of the input buffer(s) 160, and an output finite state machine (FSM) 166 for controlling use of the output buffer(s) 162. The arbiter 154, via the FSM 164, 166 of each module 150 keeps track of the availability of buffer space in the input buffers 160 of the modules 150 at all times, and exercises flow control by deferring requests to transfer data to modules with full input buffers 160. The arbiter 154 also receives all intra-chip data transfer requests from the intra-chip switch interfaces 156 of the modules 150, and arbitrates between the requests whose destinations have input buffers 160 with sufficient room to receive a data transfer (i.e., a cache line of data).

In a preferred embodiment three parallel communication lanes, also called queues, are implemented in the input buffers 160 and output buffers 162 of the ICS interface 156, as well as in the input and output buffers of interfaces (not shown) to the packet switch 126 and interconnect 134 (see FIG. 1). These lanes or queues are labeled I/O, low priority and high priority, respectively. The high priority queues in the input and output buffers are used to store messages sent from a home node to another node of the system, replies from third party nodes to the home node or the requester node for a particular transaction, and messages internal to a node. The low priority queues are used to store messages going to the home node for a particular transaction. The low priority message are thus messages for initiating new memory transactions, while the high priority messages are messages for completing previously initiated memory transactions. The I/O queues are used for handling requests being sent to I/O devices. The messages in the I/O queues are given the lowest priority by the ICS 112 and also by the packet switch 126 and interconnect 134 (see FIG. 1).

The use of multiple communication lanes generally increases the size of the input and output buffers in the interfaces to the ICS 112, packet switch 126 and interconnect 134. However, the use of multiple communication lanes is important to avoid deadlock conditions in the network, and in particular for ensuring that active memory transactions make forward progress even when the system is experiencing high levels of protocol message traffic. In alternate embodiments, four or more communication lanes are used instead of three. In particular, in one alternate embodiment the high priority lane is replaced by two separate communication lanes, one for messages sent from the home node of a memory transaction and the other for replies sent by third parties to either the home node or any other node in the system. Providing the additional communication lane helps to ensure that messages sent by the home nodes of transactions are not blocked by reply messages being sent by the same node(s) for transactions in which those nodes are not the home node, and vice versa.

From a philosophical viewpoint, the ICS 112 is the primary facility for decomposing the processor node 102 and I/O node 104 into relatively independent, isolated modules 150. For instance, the transactional nature of the ICS 112 and the uniformity of the interfaces 156 presented by the modules 150 to the ICS 112 together allow different types of modules 150 to have different numbers of internal pipeline stages for handling various type of memory transactions.

The ICS 112 uses a uni-directional, push-only data transfer technique. The initiator of a memory transaction always sources data. If the destination of a transaction is ready, the arbiter 154 schedules the data transfer according to datapath availability. A grant is issued by the arbiter 154 to the initiator of the transaction to commence the data transfer at a rate of one 64-bit word per cycle without any further flow control. Concurrently, the destination receives a signal from the arbiter 154 that identifies the initiator and the type of transfer. Transfers across the ICS 112 are atomic operations.

Each port to the ICS 112 consists of two independent 64-bit data paths (plus additional datapath bits for eight parity bits) for sending and receiving data. The ICS 112 supports back-to-back transfers without dead-cycles between transfers. In order to reduce latency, in a preferred embodiment the modules 150 are allowed to issue a "pre-request" indicating the target destination of a future request, ahead of the actual transfer request. The pre-request is used by the ICS 112 to pre-allocate data paths and to speculatively assert a grant signal to the requester.

L1 Cache

Figure 3A:
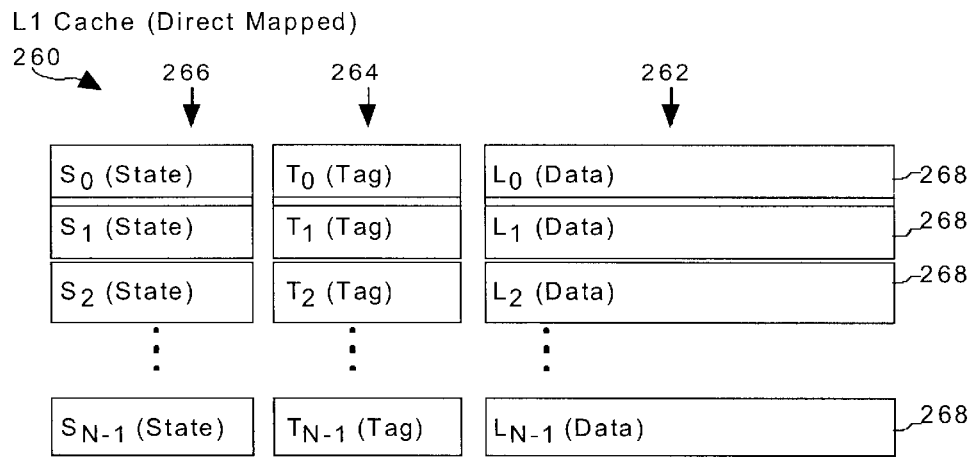
FIGS. 3A and 3B depict two embodiments of the Tag-State and Data arrays of an L1 cache.

Referring to FIG. 3A, a direct mapped version of the L1 cache 260 will be explained before explaining a two-way set associative version, shown in FIG. 3B. Each L1 cache 260, whether it is a data or instruction cache (see FIG. 1) includes a data array 262 for storing cache lines, a tag array 264 and a state array 266. Each entry 268 of the L1 cache 260 includes a cache line, a tag and a state value. The cache line consists of the data from one memory line, and in a preferred embodiment this consists of 64 bytes (512 bits) of data plus parity and ECC bits corresponding to the 64 bytes.

The tag of each entry 268 consists of the address bits required to uniquely identify the cache line, if any, stored in the entry. Each address used to access memory consists of a string of address bits, ABCD, where A, B, C and D each consist of different groups of the address bits. The D bits are used to identify specific words (or bits, or bytes, depending on the implementation) within the cache line. The B and C bits, herein called BC, identify the entry 268 into which the memory line of information at address ABCO is stored within the L1 cache. The BC bits are called the index or cache index of the address. The L1 cache contains a set of cache lines at every possible value of the cache index. In a direct-mapped cache only one cache line is mapped to each cache index, but in a set associative cache (e.g., a 2-way or 4-way set associative cache) multiple cache lines (e.g., 2 or 4 cache lines) are mapped to each cache index. The A bits comprise the tag of the cache line, which together with the cache index (the BC bits) uniquely identify the memory line.

In a preferred embodiment of this invention, the L1 cache is "virtually indexed", rather than being indexed by physical address. In a virtually indexed cache, the virtual address is used to determine the cache index for the cache line at a specified virtual address.

An "index position" within a cache identifies one or more cache lines within the cache. The number of cache lines stored at each index position is called the associativity of the cache. A direct mapped cache has an associativity of one. A two-way associative cache has an associativity of two, and thus has two cache lines at each index position of the cache. The "index position" is often called the "cache index".

Virtual indexing of the first-level (L1) cache allows the lookup of the L1 cache tag to proceed concurrently with the translation of the requested virtual memory address into a physical memory address. The L1 cache tag for a specified virtual address is the physical address of the memory line, if any, stored at the cache index, which is derived from the address bits of the virtual address. Virtual indexing of the L1 cache improves the speed at which data can be retrieved from the L1 cache, compared to indexing the cache with physical addresses, because data retrieval from the cache's data array can start without waiting for translation of the virtual address to a physical address.

The virtual to physical address translation is performed by a translation look-aside buffer ("TLB"). The tag from the cache is then compared to the physical memory address obtained from the TLB, and if there is a match (representing a cache hit), the data from the cache that corresponds to the tag is sent to the processor. If there is a miss, meaning that the retrieved tag did not match the physical address obtained from the TLB, the requested cache line of data must be obtained from a second-level cache or main memory.

While virtual indexing speeds up the lookup of a cache, it may also give rise to the possibility of synonyms. Synonyms are cache lines at different cache indices that map to the same physical memory address, and therefore refer to the same data entry. Synonyms may arise when a memory line is shared by two or more different programs, or different parts of the same program, which access it using two or more different virtual addresses. If the size of the cache divided by its associativity is greater than the size of the memory pages used in the system, the cache line at any given physical memory address can be stored at more than one index position within the cache. More specifically, the number N of index positions at which any cache line may be found within the cache is equal to:

$$N = \frac{\text{cache size}}{\text{associativity} \times \text{page size}}$$

Having more than one cache index position correspond to the same physical memory address can give rise to a memory coherence problem if the data at one virtual memory address is changed without changing the data for another virtual memory address that maps to the same physical memory address. It is therefore necessary to either prevent synonyms from occurring or detect and resolve synonyms before they give rise to a memory coherence problem.

In addition, in the context of a shared memory multi-processor computer system with multiple first-level caches, it is also necessary to ensure that the cache coherence logic handling a request for a particular physical memory address be able to find any and all copies of the corresponding cache line, including those in first-level caches, even though there may be multiple L1 cache index positions at which the identified cache line may be stored within any particular L1 cache.

In one embodiment, the state of each L1 cache entry 268 is represented by two bits, which for each cache line represent one of four predefined states:

invalid, which means that the cache entry 268 is empty, or that the data in it is invalid and should not be used;
shared, which means that other processors or other nodes in the system have non-exclusive copies of the same memory line as the one stored in the cache entry;
clean_exclusive, which means that this L1 cache has the only copy of the associated memory line, has been allocated exclusive use thereof, and that the value of the cache line has not been changed by the processor coupled to the L1 cache; and
dirty_exclusive, which means that this L1 cache has the only copy of the associated memory line, has been allocated exclusive use thereof, and that the value of the cache line has changed by the processor coupled to the L1 cache.

Figure 3B:
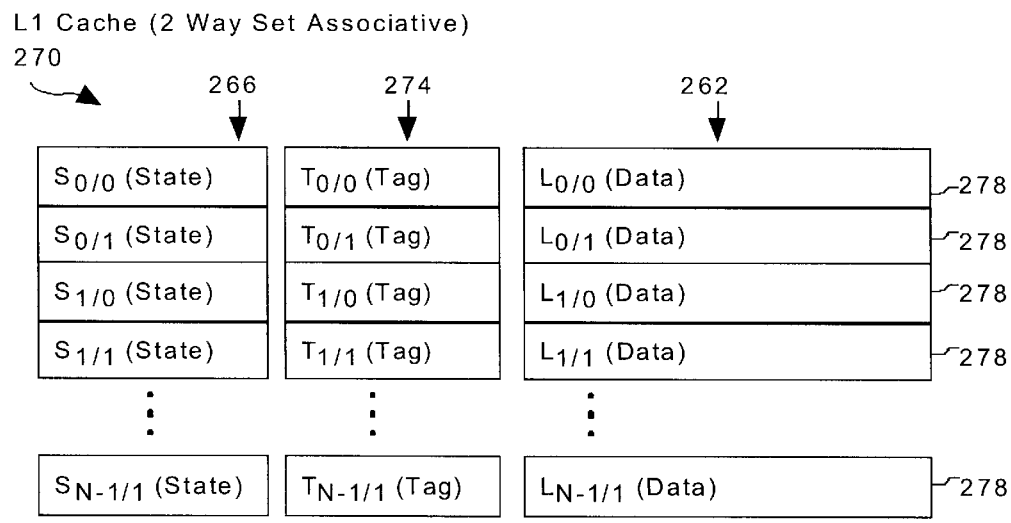

Referring to FIG. 3B, there is shown a two-way associative version of the L1 cache, which may be used in an alternative implementation. Only the differences between the L1 caches of FIGS. 3A and 3B will be described. In particular, the set associative L1 cache 270 has the same number of entries 278 as the direct mapped L1 cache 260, but in this version two cache lines are mapped to each cache index instead of just one. As a result, there are only half as many cache index values, and therefore the cache index is represented by just the C bits of the ABCD address bits. In this embodiment of the L1 cache, the B address bit of each memory line address is included in the tag of the entry, and thus the tag array 274 is one bit wider in this embodiment than in the direct mapped L1 cache embodiment. If the L1 cache were a four-way associative cache, the tag array 274 would be two bits wider than in the direct mapped L1 cache embodiment. A two-way associative L1 cache may be preferred over a direct mapped cache because it reduces cache evictions caused by cache index conflicts. On the other hand, set associative caches require the use of significantly more complicated circuitry than direct mapped caches.

While the remaining portions of the description of the preferred embodiments assume that the L1 cache is a direct mapped cache, the present invention is equally applicable to set associative L1 caches.

L1 Data Paths and Control Logic

Figure 4:
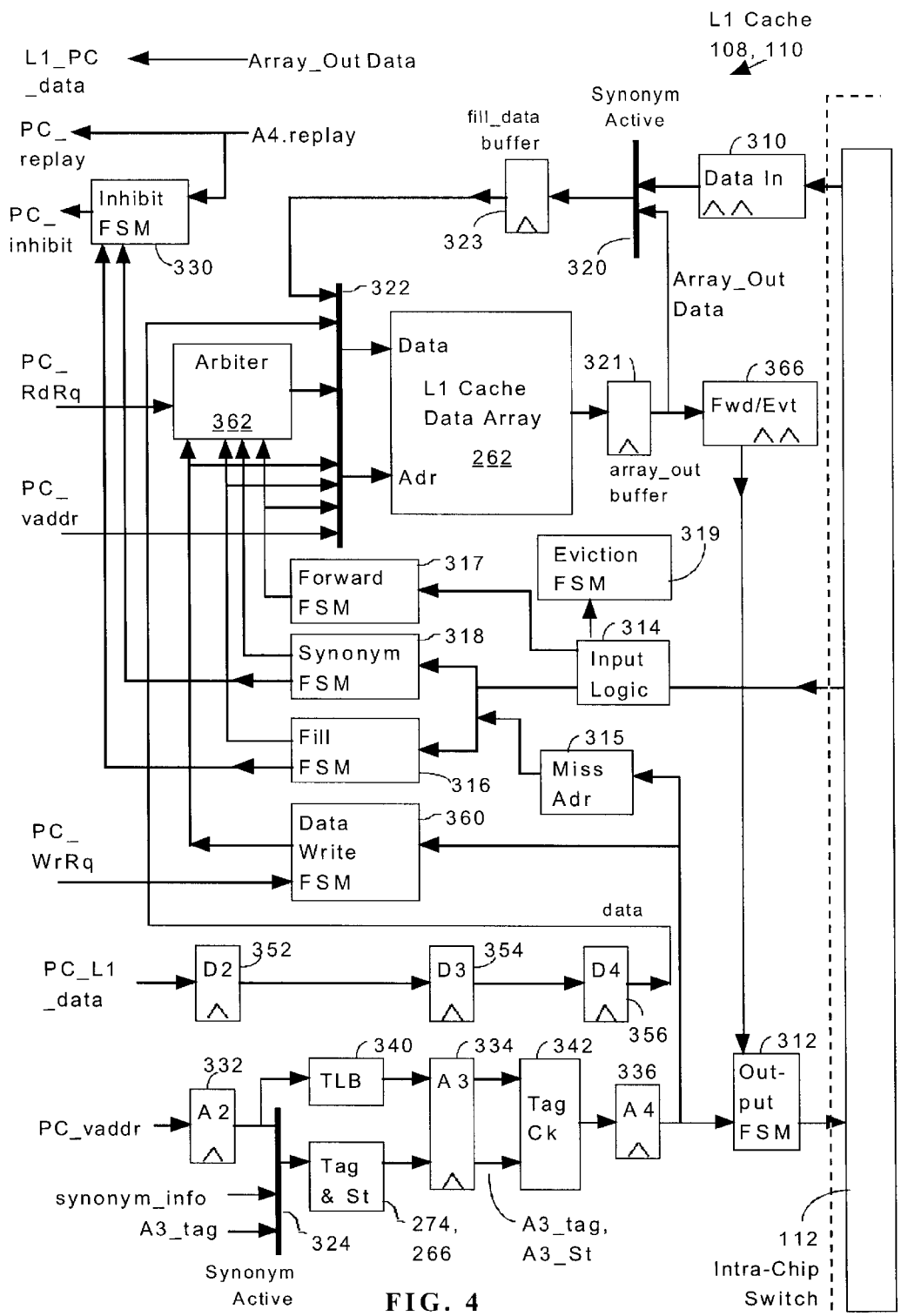
FIG. 4 shows the architecture of the L1 cache.

FIG. 4 shows the data paths and primary components of the L1 cache 108, 110. Some of the connections between the various finite state machines of the L1 cache and some of the connections between those finite state machines, the tag and state arrays 274, 266 and other components of the L1 cache 108, 110 that are described below are not shown in FIG. 4 in order to avoid undue cluttering of this figure.

The L1 cache receives data (PC_L1_data) and a virtual address (PC_vaddr) from the processor core (PC) coupled to the L1 cache. Other signals received by the L1 cache from the PC are a read request signal (PC_RdRq), which signals that the PC is requesting data from the L1 cache, and a write request (PC_WrRq), which signals that the PC is requesting to write data into the L1 cache. The signals sent by the L1 cache to the PC include data output by the L1 cache (L1_PC_data), a replay signal (PC_replay) requiring the processor to retry the last request sent by the PC to the L1 cache, and an inhibit signal (PC_inhibit) to inform the PC to inhibit its memory accesses because the L1 cache is busy (e.g., servicing a cache miss).

The L1 cache receives data from and sends data to the L2 cache, main memory, and other devices via the intra-chip switch 112. Received data is temporarily buffered by a data in buffer 310, and data being sent elsewhere is output via an output finite state machine (Output FSM) 312. The output buffer for sourcing data to the ICS 112 is called the Fwd/Evt buffer 366.

Input logic 314 receives control signals sent via the ICS 112 and conveys those control signals to a fill FSM 316, a forward FSM 317, a synonym FSM 318, and/or an eviction FSM 319. The fill FSM 316 controls the loading of a cache line received from the ICS 112 into the L1 cache data array 262. The forward FSM 317 controls the forwarding of a cache line, at the request of a device elsewhere in the system, via the ICS 112. For instance, a protocol engine in the same node as the L1 cache may send a request to the L1 cache to forward a copy of a specified cache line to the protocol engine, which may then forward the cache line to another node in the system or to another L1 cache in the same node of the system as the L1 cache sourcing the cache line. The eviction FSM 319 controls the eviction of a cache line from the L1 cache. The eviction FSM 319 sends a copy of an evicted cache line to the L2 cache, but does not invalidate or otherwise modify the tag of the evicted cache line. A line is only evicted when it is the target of a miss request. An eviction is therefore always preceded by a fill operation, and the line's tag is updated as part of that fill operation.

The synonym FSM 318 controls the movement of a cache line from one L1 cache slot to another when the L2 cache instructs the L1 cache to do so. Multiplexer 320 routes cached data from a slot of the L1 cache data array 262 back to the data array input multiplexer 322 under the control of the synonym FSM 318. Input and output staging buffers 321, 323 are preferably used in this data path, for instance to facilitate delivery of successive portions of the data in a cache line over the data path.

When the synonym FSM 318 is not active, multiplexer 320 sources data from the data input buffer 310 to the data array input multiplexer 322. A synonym is detected when the virtual index derived from a virtual address does not match the physical location of a cache line in the L1 cache. As is more fully explained below, a cache line is then copied from one L1 cache slot to another. A tag information input multiplexer 324 is also controlled by the synonym FSM 318 to enable tag and state information for the L1 tag and state arrays 274, 266 to be sourced by the synonym FSM 318 when the synonym FSM 318 is activated. When the fill FSM 316 is active, tag and state information are sourced by the fill FSM 316 and that information is conveyed by the tag information input multiplexer 324 to update the tag and state arrays 274, 266. When neither the fill FSM 316 nor the synonym FSM 318 are active, the tag information input multiplexer 324 sources tag information for the L1 tag array 274 from the virtual address (PC_vaddr) provided by the PC.

An inhibit FSM 330 receives signals from the fill FSM 316 and synonym FSM 318 when those finite state machines are activated and sources the PC_inhibit signal to the processor core while either of these finite state machines is servicing a cache fill or synonym cache line relocation operation. The PC_inhibit signal instructs the processor core to not send any further cache access requests until the PC_inhibit signal is deactivated.

When the processor core sends either a read or write request to the L1 cache, the processor core provides a virtual address, PC_vaddr. The virtual address and information derived from it, such as a valid tag match signal, are stored in a series of staging buffers 332, 334, 336. Additional staging buffers, beyond those shown in FIG. 4, may be required in some implementations. The virtual address is translated into a physical address (PA) by a translation lookaside buffer (TLB) 340 at the same time that a tag and state lookup is performed by the tag and state arrays 274, 266. The resulting physical address and tag lookup results are stored in a second staging buffer 334 and are then conveyed to a tag checking circuit 342 that determines if there is a tag match for a valid cache line.

The tag checking circuit 342 includes a comparator that compares the address tag read from a cache line and the physical address output by the TLB. The tag checking circuit 342 also checks the state of the cache line, represented by a two-bit state field in the preferred embodiment. If the state of the cache line is "invalid," the address tag read from the cache line is logically treated as a null value that cannot match any physical address output by the TLB. When the address tag read from the cache line and the physical address output by the TLB match, and the state of the cache line is not "invalid," the tag checking circuit 342 outputs a signal indicating a "hit", and otherwise it outputs a signal indicating a "miss."

The results of the tag check, which includes state information as well as tag match information and the virtual address being checked, are stored in yet another staging buffer 336. The information in the staging buffer 336 is conveyed to a data write FSM 360 when a valid match is found, and is conveyed to the output FSM 312 when a cache miss is detected. When a cache miss is detected, the virtual address (or at least the virtual cache index portion of the virtual address) in staging buffer 336 is stored in the Miss Address buffer 315 for later use by either the Synonym FSM 318 or the Fill FSM 316. Both of these FSM's 316, 318 use the virtual address information in the Miss Address buffer 315 to control the location into which data, tag and state information are written into the L1 data, tag and state arrays 262, 274, 266, when the cache miss is resolved. In one embodiment, the physical address output by the TLB 340 is also stored in the staging buffer 336 and Miss Address buffer 315, and only VPN bits of the virtual address are stored in these buffers 336, 315. Storing the physical address in these buffers eliminates the need to include the physical address in miss and synonym replies by the L2 cache.

The final staging buffer 336 also stores a "replay" signal, generated by the tag checking circuit 342, and the replay signal is conveyed to the processor core to indicate whether the L1 read or write operation requested by the processor core must be resubmitted to the L1 cache after the PC_inhibit signal is deactivated.

When a data write is being performed, the write request signal (PC_WrRq) and the results of the tag lookup are used by a data write FSM 360 and a cache access Arbiter 362 to determine if (and when) the data sourced by the processor core is to be written into the L1 cache data array 262. The data sourced by the processor core is buffered in a series of staging buffers 352, 354, 356 so that the data to be written is available at the data array input multiplexer 322 at the same time that the tag check results become available to the data write FSM 360. The data write FSM 360 stalls the data pipeline 352, 354, 356 if the arbiter 362 determines that the L1 cache is not ready to store the sourced data into the L1 cache data array 262.

When a data read is being performed, the read request signal (PC_RdRq) is received directly by the arbiter 362 and the virtual address is used to directly read a cache line in the L1 cache data array 262 even before the results of the tag lookup and check are ready. The data read from the data array is temporarily buffered in the array_out buffer 321 and is discarded if a cache miss is detected. If the read data is being read in response to a processor core (PC) request and a cache hit is detected, the read data is sourced from the array_out buffer 321 to the PC via the data path labeled Array_Out Data (L1_PC_data). If the read data is being read in response to a request received via the intra-chip switch (ICS) 112, the read data is sourced from the array_out buffer 321 to the Fwd/Evt buffer 366, and from there it is conveyed to the output FSM 312 for transmission to the requesting device via the ICS 112.

L2 Cache with Duplicate L1 Tags

Figure 5A:
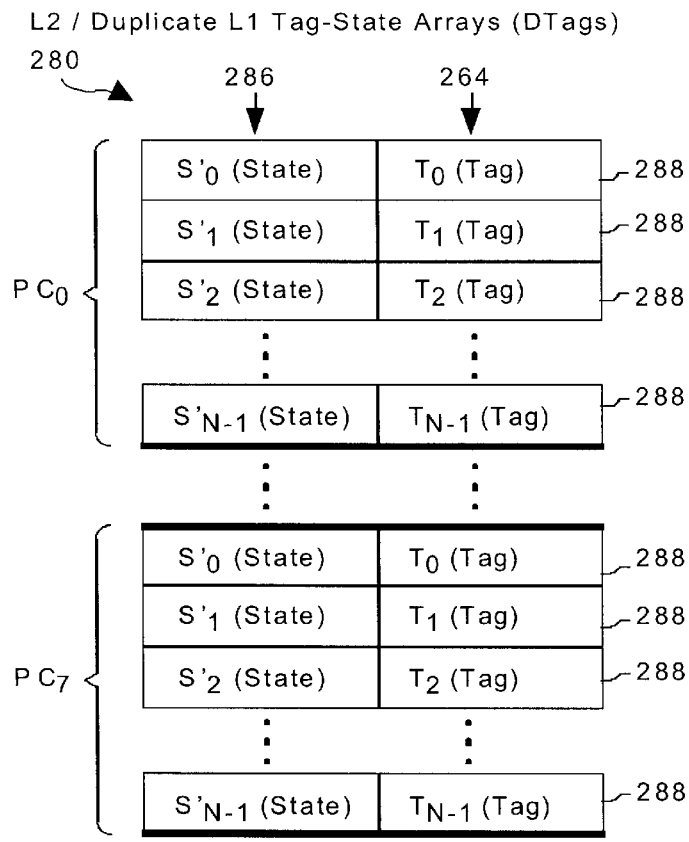
FIGS. 5A and 5B depict the duplicate tag, tag-state and data arrays of an L2 cache.

Referring to FIG. 5A, the L2 cache includes a set of "duplicate L1 tag and state arrays" 280 for a direct mapped L1 cache. These "Dtag" (duplicate tag) arrays 280 contain exact copies of the tag arrays of all the L1 caches in the same node as the L2 cache, and furthermore contain state information that is similar to, but not identical, to the state information in the L1 cache state arrays 266 (FIG. 3A). Thus, each entry 288 of the Dtag arrays 280 corresponds to exactly one of the L1 cache entries 268 in the L1 caches of the node. The relationship between the state information in the L1 cache, the state information in the Dtag arrays 280 of the L2 cache, and the state information in the L2 cache (see FIG. 5B) is as follows:

| L1 state | Dtag-L1 state | Possible corresponding L2 states |
| --- | --- | --- |
| invalid | invalid | invalid, clean, clean_nodex, dirty |
| shared | shared_clean | invalid, clean, clean_nodex, dirty |
|  | shared_clean_owner | invalid |
|  | shared_clean owner nodex | invalid |
|  | shared_dirty | invalid |
| clean_exclusive | exclusive | invalid |
| dirty_exclusive |  | invalid |

As shown in the above table, the L2 cache keeps additional information in the Dtag arrays regarding the ownership of shared cache lines. For instance, the shared_clean_owner_nodex state for any particular cache line indicates that the cache line in the L1 cache has not been modified, and that this node is the exclusive owner of the cache line. The clean_nodex state in the L2 cache means the same thing.

An L1 cache line with a Dtag state of exclusive, shared_dirty, shared_clean_owner or shared_clean_owner_nodex is the owner of the cache line. If the L2 cache has a valid copy of the cache line, it is the owner of the cache line, and the only possible Dtag states for that cache line are invalid or shared_clean. An L1 cache always performs a write-back when it replaces a cache line of which it is the owner. The written back cache line is loaded into the L2 cache, possibly victimizing another L2 cache line.

The L1 cache owner of a cache line responds to other L1 misses on the same cache line. In this case the requester of the cache line become the new owner and the previous owner's Dtag state for the cache line is changed to shared_clean.

If a cache line is present in a particular node, node-exclusive information is kept in either the L2 state or the Dtag state of the owner L1 cache. The L2 states clean_nodex and dirty, and the Dtag states shared_clean_owner_nodex, shared_dirty and exclusive all indicate that the node is the only node in the system that is caching the identified memory line (i.e., identified by the tag and cache index of the cache line). In a preferred embodiment, dirty (i.e., modified) cache lines are never shared across nodes. Thus, if a node has a cache line that has been modified with respect to the memory copy, no other node in the system can have a copy of the line. As a result, when a node requests a shared copy of a cache line that has been modified by another node, the memory transaction that satisfies the request will always write-back the modified data to memory. Within a single node, however, a preferred embodiment allows sharing of a modified cache line among the processor cores. In this case, the Dtag state of the L1 owner is set to shared_dirty and any other sharers have their Dtag state set to shared_clean.

While the Dtag arrays 280 preferably contain only the tag arrays and state information for the L1 cache lines, in other embodiments they also may contain all the information (i.e., including the data from the cache lines) in the L1 cache.

Figure 5B:
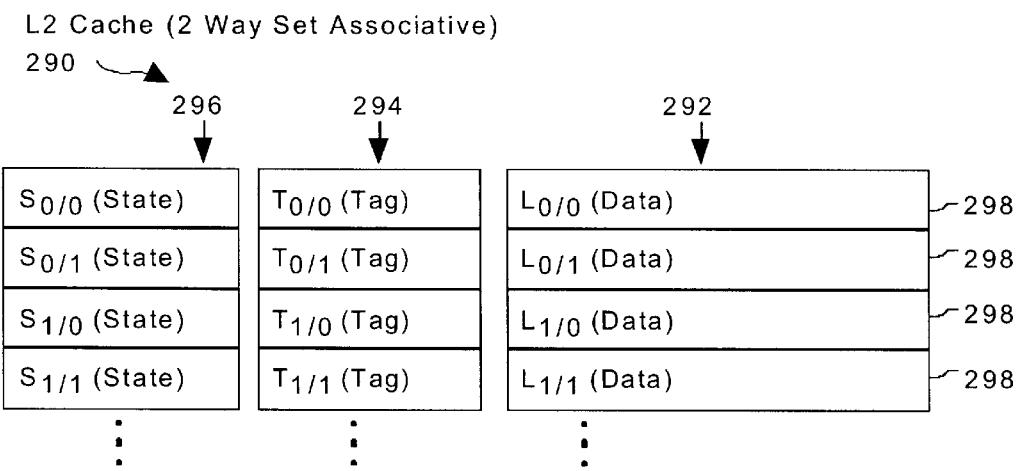

Referring to FIG. 5B, the main L2 cache array 290 includes a data array 292 for storing cache lines, a tag array 294 and a state array 296. The L2 cache array is preferably distributed across eight interleaved arrays, but for purposes of this explanation, the interleaved array structure is not shown, as it does not affect the logical organization and operation of the L2 cache. Each entry 298 of the L2 cache 290 includes a cache line, a tag and a state value. The cache line consists of the data from one memory line, and in a preferred embodiment, this consists of 64 bytes (512 bits) of data plus parity and ECC bits corresponding to the 64 bytes.

The tag of each entry 298 consists of the address bits required to uniquely identify the cache line, if any, stored in the entry. Because the L2 cache is typically much larger than the L1 caches, a different subset of the address bits of a memory line address is used to identify the cache index and a different subset of the address bits is used as the tag compared with the address bits used for those purposes in the L1 caches.

The L2 cache line state value for each L2 cache entry is selected from among the following state values:

invalid, which means that the cache entry 298 is empty, or that the data in it is invalid and should not be used;

clean, which means that the value of the memory line has not been changed and is therefore the same as the copy in main memory, and furthermore means that copies of the cache line may be stored in (A) one or more of the L1 caches of the same node as the L2 cache and/or (B) the L1 or L2 caches in other nodes of the system, and that these copies are non-exclusive copies of the same memory line as the one stored in the L2 cache entry;

clean_nodex (clean node-exclusive), which means that the L2 cache has a clean copy of the associated memory line (i.e., the memory line has not been changed and is the same as the copy in main memory), and that there may be cached copies of this memory line in local L1 caches in the same node as the L2 cache, but there are no copies of the memory line in any other nodes of the system; and dirty, which means that this L2 cache has the only copy of the associated memory line, and that the value of the cache line has been changed by one of the processor cores coupled to the L2 cache.

L2 Data Paths and Control Logic

Figure 6:
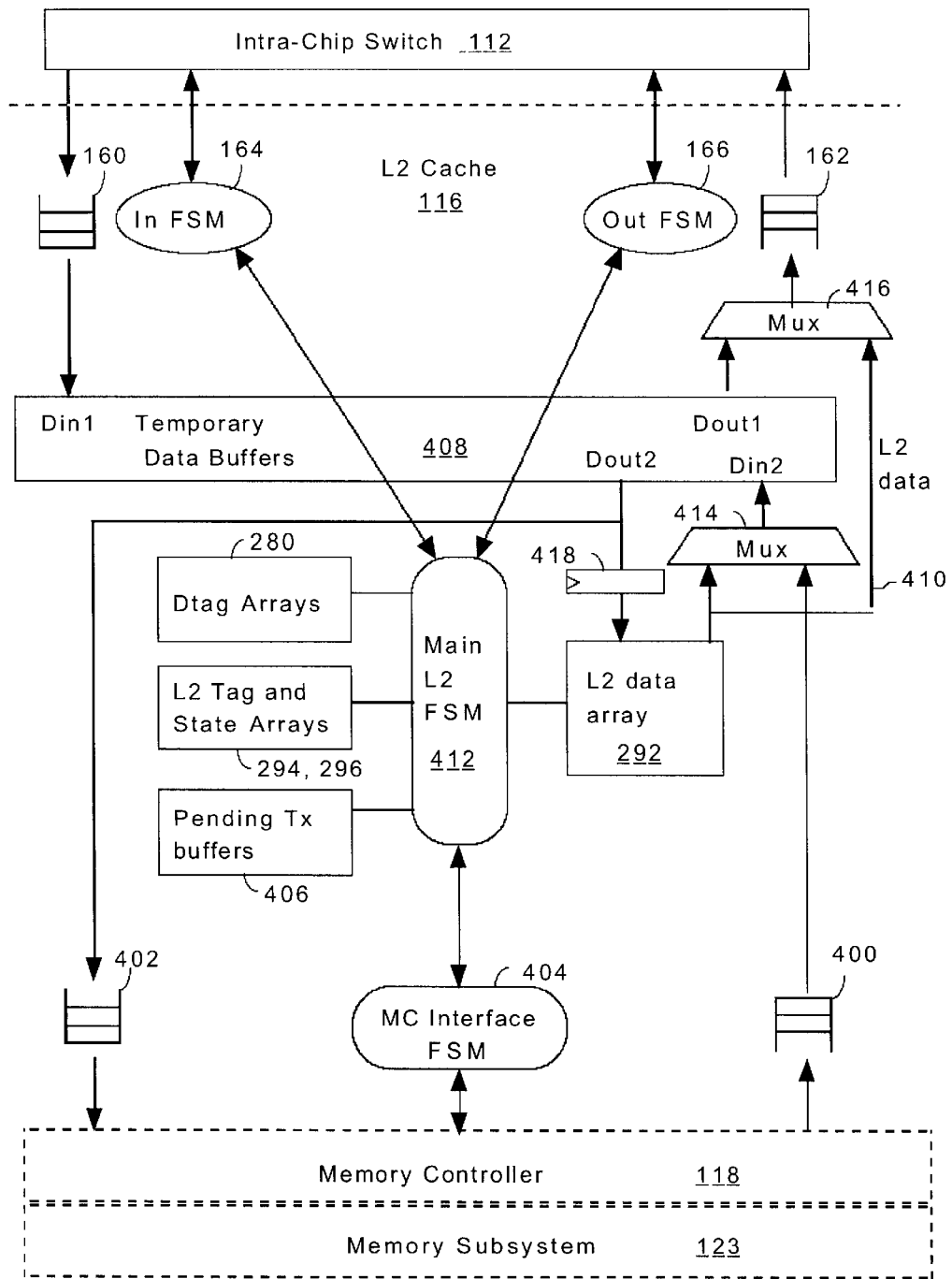
FIG. 6 shows the architecture of the L2 cache.

FIG. 6 shows the data paths and primary components of the L2 cache 116. As described earlier with respect to FIG. 3, the L2 cache has an interface to the intra-chip switch 112. This interface includes one or more input buffers 160, one or more output buffers 162, an input finite state machine (In FSM) 164 for controlling use of the input buffer(s) 160, and an output finite state machine (Out FSM) 166 for controlling use of the output buffer(s) 162. Similarly, the L2 cache 116 has an interface to the memory controller 118 (see also FIG. 1) that includes one or more input buffers 400, one or more output buffers 402 and a memory controller interface finite state machine (MC interface FSM) 404 for controlling the use of the MC interface input and output buffers 400, 402.

A set of pending buffers 406 are used to store status information about memory transactions pending in the L2 cache. For instance, the pending buffers 406 keep track of requests made to the memory subsystem (see FIG. 1) via the memory controller 118. A set of temporary data buffers 408 are used to temporarily store cache line data associated with pending memory transactions, including data being sourced to the L2 cache, data sourced from the L2 cache, and data transported through the L2 cache (i.e., from the memory subsystem 123 to the L1 cache). Data sent by the L2 cache in response to an L1 cache miss bypasses the temporary data buffers 408 and is sent via a bypass data path 410 so as to reduce latency when the L2 cache contains the data needed to satisfy a cache miss in an L1 cache (which is coupled to the L2 cache via the ICS 112).

The duplicate tag (Dtag) arrays 280 and L2 tag and state arrays 294, 296 have been discussed above with reference to FIGS. 5A and 5B. Access to and updating of these arrays is handled by the main L2 finite state machine 412. The main L2 FSM 412 includes Dtag and tag lookup, Dtag and tag checking, and Dtag, tag and state updating logic.

When an L1 cache miss is serviced by the L2 cache 116, a synonym copy is not found using the information in the Dtag arrays 280 and the L2 cache does not have a cached copy of the memory line required by the L1 cache, the request is forwarded to the memory subsystem 123 via the MC interface FSM 404. The memory line of information provided by the reply from the memory subsystem 123 is not stored in the L2 cache 116. Instead the memory line is sent directly to the L1 cache, bypassing the L2 data array 292. More specifically, the reply from the memory subsystem is directed through multiplexer 414 to the Din2 input port of the temporary data buffers 408. The reply is then output at the Dout1 port of the temporary data buffers 408 to the interface output buffer 162 via output multiplexer 416.

When an L1 cache evicts a memory line from the L1 cache, the victim memory line is sent to the L2 cache for storage via the ICS 112 and the interface input buffer 160. The victim memory line is received at the Din1 input port of the temporary data buffers 408 and temporarily stored therein. The victim memory line is then sent from the temporary data buffers 408 to the L2 data array 292, via the Dout2 port of the temporary data buffers 408 and a staging buffer 418, for storage in the L2 data array 292.

When the L2 cache sources a memory line to an L1 cache, the memory line read from the L2 data array 292 is conveyed via bypass line 410 to output multiplexer 416, and from there to the ICS interface output buffer 162. The output FSM 166 handles the transfer of the memory line from the output buffer 162 to the ICS 112, and from there it is sent to the L1 cache. Duplicate tags (Dtags) are used by the L2 cache to determine which L1 caches have cached copies of an identified memory line. The duplicate tags in the Dtag arrays 280 are accessed by the main L2 FSM 412, and information derived from the duplicate tags is used to send messages via the output FSM 166 to one or more of the L1 caches in the same node as the L2 cache, or to other components of the node.

Locating Synonyms in the Dtags of the L2 Cache

Figure 7A:
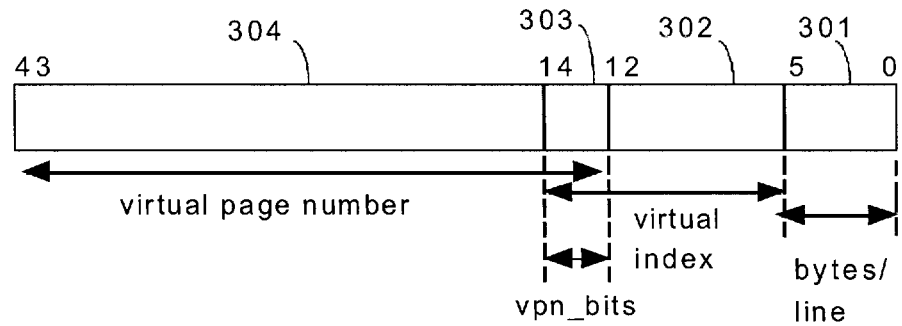
FIGS. 7A and 7B depict an exemplary map of the address bits in the virtual address used for addressing the L1 cache and the possible synonym locations in the L1 cache.

FIG. 7A illustrates the bits of the virtual memory address bits that are used for virtually indexing the L1 cache and the Dtags of the L2 cache. The lowest order bits 301, which range from bit 0 to bit 5 in the example, identify specific bytes within the cache line and correspond to the D bits discussed above in connection with FIGS. 3A and 3B. The virtual index used to identify a cache line to be accessed in the L1 cache consists of bits 302 and 303, which range from bit 6 to bit 14 in the example. Finally, the most significant bits 304, which range from bit 15 to bit 43 in the example, combined with bits 303 prescribe the virtual page number, also called the virtual page address.

The L1 cache's virtual index (i.e., the cache index) is determined by bits 302 and 303 of a specified virtual address, while the page number of the specified virtual address is determined by bits 303 and 304 of the virtual address. The overlapping bits of the virtual page number and the cache index are herein called the "vpn bits". In other words, the vpn bits 303 are the lowest order bits of the virtual page number and the highest order bits of the virtual index. The number of vpn bits, M, is equal to $$M = \text{ceiling}\left(\text{Log}_2\left(\frac{\text{cache size}}{\text{associativity} \times \text{page size}}\right)\right)$$

where the "ceiling" function rounds up the value to which the ceiling function is applied to the closest integer if that value is not already an integer. If the L1 cache is direct mapped, which means that the associativity is equal to 1, then the number of vpn bits is the number of bits required to represent the ratio of the cache size to the page size. For instance, if the L1 cache has a size of four pages, then the number (M) of vpn bits will be equal to 2.

The vpn bits of a virtual address identify which one of the possible N synonym cache index positions in the L1 cache corresponds to the specified virtual address. The other N-1 synonym cache index positions have the identical cache index value, except for the M most significant bits thereof. Because there are two vpn bits 303, at bit positions 13 and 14 in the example, there are four possible synonym locations in the example.

Figure 7B:
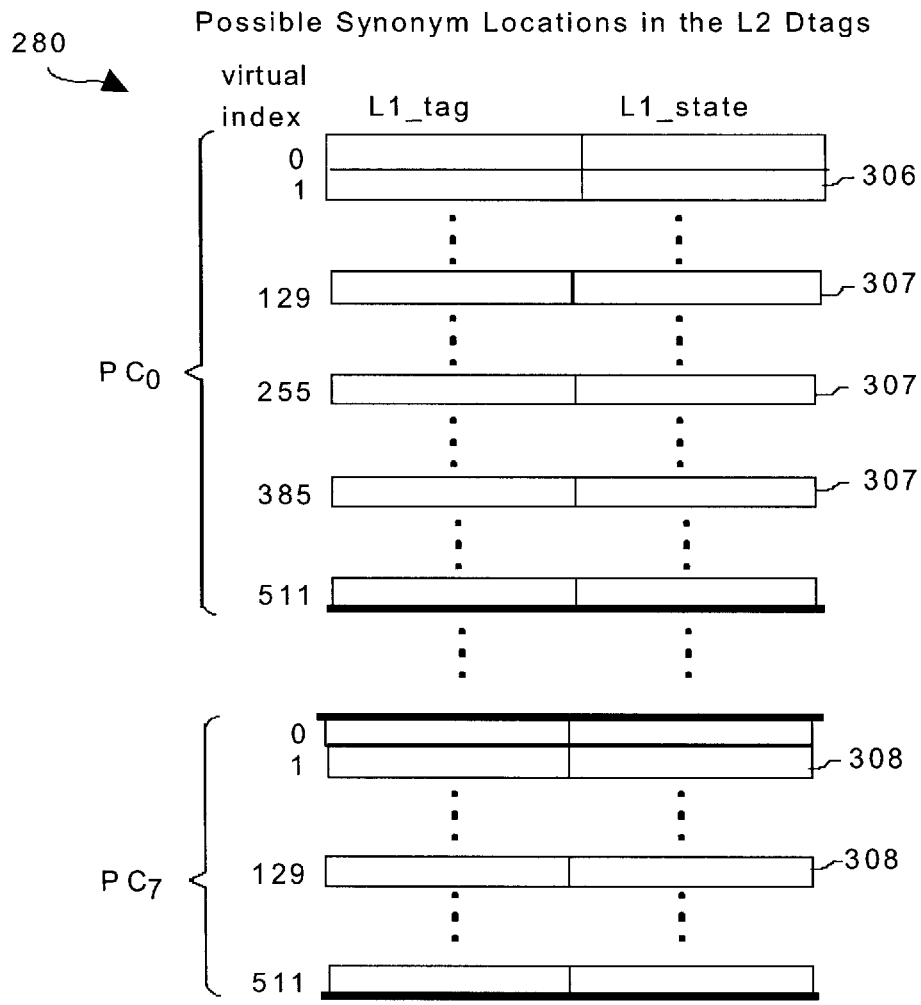

FIG. 7B shows an example of synonym locations in the Dtag array in the L2 cache 280, which correspond to synonym locations in the L1 cache. For a cache line 306 at virtual index 1, there are possible synonym locations 307 at virtual indices 129, 255, and 385. In addition to the possible synonym locations within the local L1 cache of the processor core ($PC_0$) from which the request for the memory address came, it is also possible for copies of the same memory line to be found in the L1 caches for the other processor cores (in the example shown in FIG. 7B from $PC_1$ through $PC_7$), and for each of those copies of the memory line to be stored at any of the synonym locations within the other L1 caches, for example at locations 308. Within each L1 cache at most one copy of the memory line will be stored at just one of the synonym locations.

L2 Lookup Control Logic

Figure 8A:
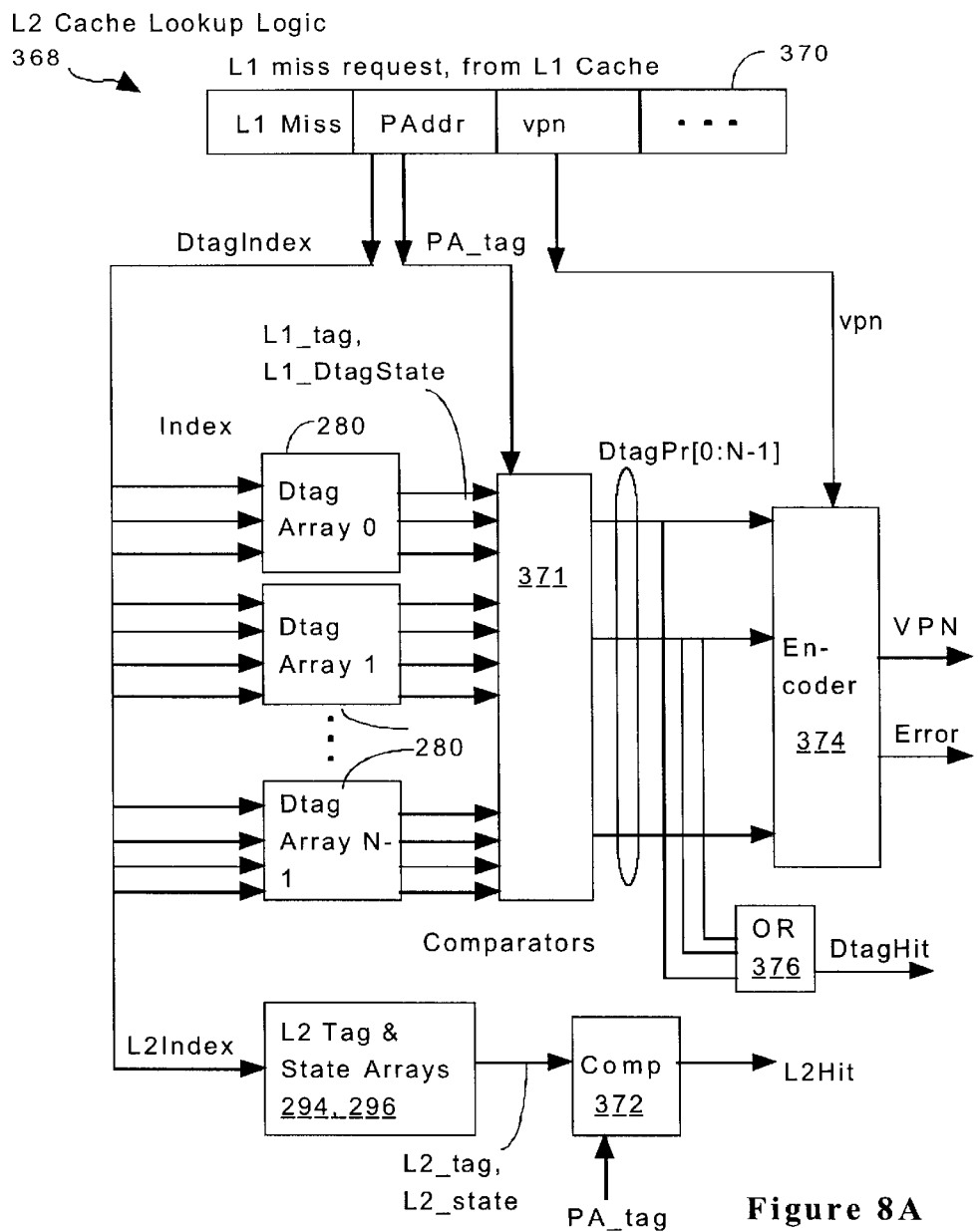
FIG. 8A is a block diagram of the control logic for the lookup of the L2 cache after a miss in the L1 cache.
Figure 8B:
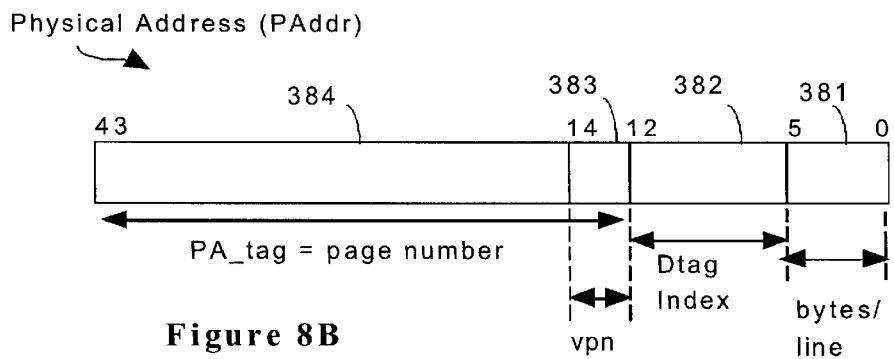
FIG. 8B depicts an exemplary map of the address bits in the physical address used for addressing the Dtag arrays and the L2 tag, state and data arrays in the L2 cache.

Referring now to FIGS. 8A and 8B, there is shown the control logic 368 for the lookup of the L2 cache after a miss occurs in the L1 cache. The L2 cache receives and buffers an L1 miss request 370 that includes the physical address (PAddr) of the requested cache line, the vpn bits of the virtual address specified by the processor core, and possibly other information not relevant to the present discussion. A first portion of bits of the physical address PAddr in the L1 miss request are used as the Dtag index, Dtagindex, for looking up tag and state information in a set of parallel Dtag arrays 280. The number of parallel Dtag arrays 280 is equal to the number, N, of synonym positions for any given memory line address. The Dtag arrays 280 are arranged in parallel, as shown in FIG. 8, to facilitate simultaneous lookup of the tag and state values for all possible synonym positions of the specified memory line. In the example given here, there are four Dtag arrays 280, and thus the Dtagindex includes two fewer bits than the virtual index used by the L1 cache to perform the L1 cache tag lookup.

FIG. 8B shows how various portions 381, 382, 383, 384 of the physical address (PAddr) in the L1 miss request correspond to signals used in the L2 control logic 368. It is to be understood that FIG. 8B is only an example, and that the particular division of bits between the Dtagindex, vpn and page number portions depends on size of the address space in the system, the number of cache index positions in the L1 cache, and the ratio of the cache size to the system's memory page size. Bits 382 of the physical address constitute the Dtagindex. It may be noted that bits 382 of the physical address are identical to bits 302 of all corresponding virtual addresses, because the boundaries of virtual pages coincide with the boundaries of physical memory pages. Also, the physical address specified in the L1 miss request will typically not include bits 381, because those address bits are used specify a particular byte or word within a cache line. If bits 381 are included in the physical address in the L1 miss request, these bits are ignored by the L2 control logic 368 for purposes of locating a synonym in the L1 cache or for locating a corresponding cache line in the L2 cache's data array.

The L1 tags stored in the Dtag arrays 280 at the N possible synonym locations are sent to comparators 371 and compared to the cache tag, PA_tag, for the requested cache line. The cache tag, PA_tag, is the page number portion of the physical address specified in the L1 miss request. In FIG. 8B, address bits 383 and 384 form the cache tag, PA_tag.

The comparators 371 not only compare the tag values in the N Dtag entries with PA_tag, to determine if there is match, the state value of each of the N Dtag entries is also inspected by the comparators 371 to determine if the state value indicates that the Dtag entry is invalid. The comparators 371 output a signal for each of the N Dtag entries having a first value (e.g., 1) if the tag in the Dtag entry matches the PA_tag and the state in the Dtag entry indicates a valid Dtag entry (i.e., the state is not the "invalid" state), and otherwise outputs a second value (e.g., 0). In other words, the comparators 371 generate N hit/miss signals, one for each synonym position of the requested cache line.

The N hit/miss signals are logically combined by an OR gate 378 (or logically equivalent circuitry) to produce a DtagHit signal, whose value indicates whether or not the requested cache line is stored in the L1 cache at any of the N synonym positions. The N hit/miss signals are also combined by an encoder 374 to generate a "VPN" value indicating which of the N synonym positions in the L1 cache contains the requested cache line. The VPN value has M bits, (where M is defined as above. The VPN bits, concatenated with (i.e., pre-pended to) the index bits 382 of the physical address, identify the cache index in the L1 cache containing the requested cache line.

The encoder 374 also generates an Error signal that is enabled only if the identified synonym position (i.e., VPN) of the requested cache line matches the "vpn" value in the L1 miss request. The VPN value generated by the encoder 374 must not match the "vpn" value in the L1 miss request, because this would indicate that the L1 cache erroneously failed to find the requested cache line at the original cache index read by the L1 cache. Thus the Error signal, if enabled, would indicate either an error in the L1 cache, a communication error between the L1 and L2 caches, an error in the Dtag arrays 280 or possibly some other system error.

Assuming the Error signal is not enabled and the DtagHit signal is enabled, indicating that a valid synonym was found by the L2 cache lookup logic 368, the L2 cache sends a reply message to the L1 cache. The reply message contains the VPN value generated by the encoder 374, along with the physical address (PAddr) and an indicator that the reply message is a response to an L1 miss request. The L1 cache locates the requested cache line by concatenating the VPN value in the reply message to the index bits 382 of the physical address PAddr from the cache index of the requested cache line.

At the same time that the Dtag lookup operation is performed, a lookup of the L2 tag and state arrays 294, 296 is also performed. The L2 tag at the appropriately indexed location is compared by another comparator 372 with the PA_tag to determine if they match. The L2 cache index is formed by a subset of the PAddr bits. The number of such address bits of the PAddr used to form the L2 cache index depends on the number of cache index positions in the L2 cache (i.e., the number of address bits used to form the L2 cache index is equal to $\log_2$(number of cache index positions in L2 cache)).

If the L2 tag matches the PA_tag, and the state value of the L2 cache line is not the "invalid" state, an L2 Hit signal is generated and the contents of the L2 tag, state and data arrays are sent to the L1 cache.

Otherwise, if the Dtag lookup does not produce a Dtag hit and the L2 lookup also produces a miss, the requested cache line is retrieved from main memory.

L2 Finite State Machine—Responding to L1 Miss Request

Figure 9:
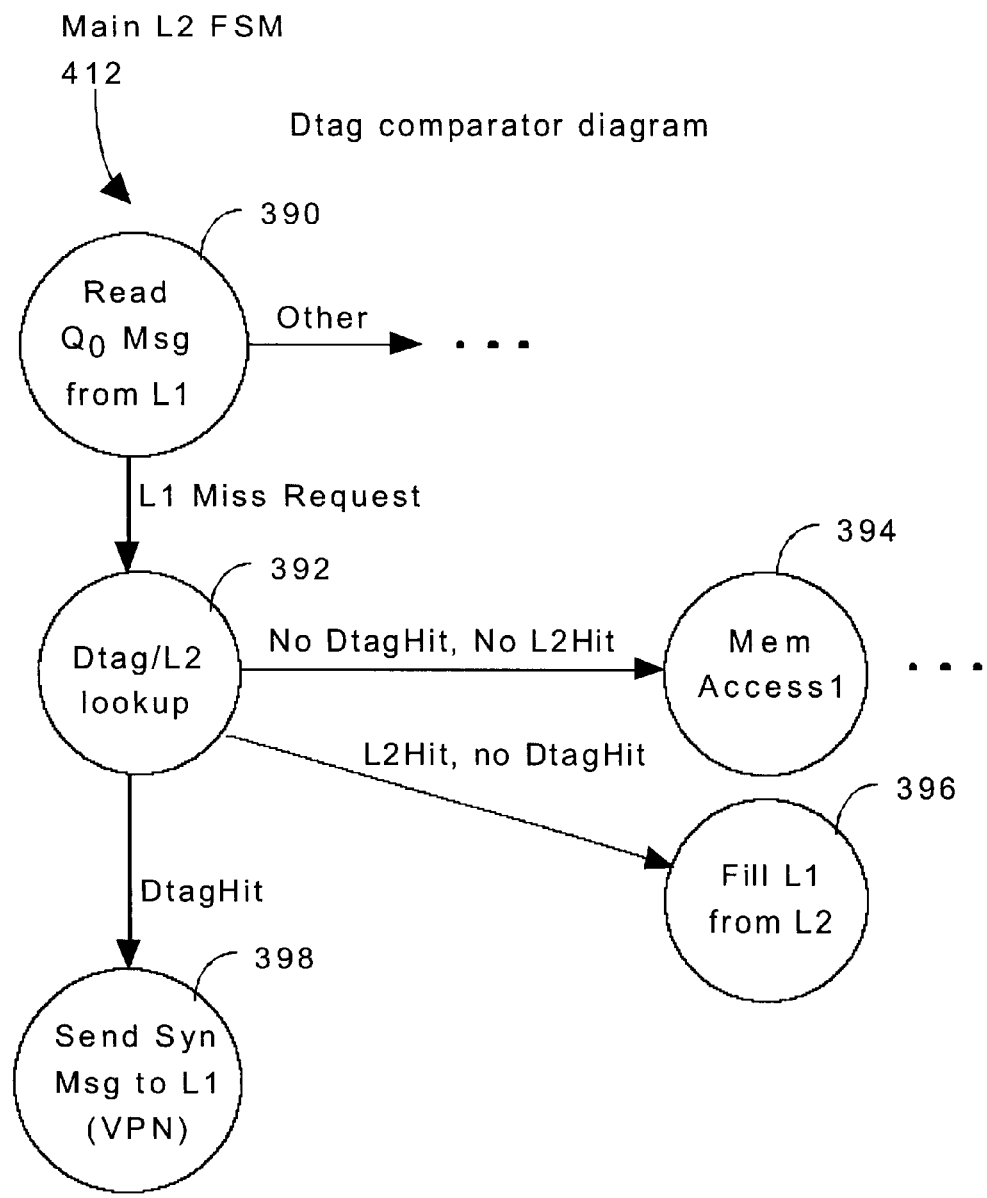
FIG. 9 is a diagram of a portion of the Ma in L2 finite state machine.

Referring to FIGS. 6 and 9, the portion of the Main L2 FSM that controls the operation of the L2 cache while responding to an L1 miss request is shown. The states of the Main L2 FSM shown in FIG. 9 occur after the L1 miss request has been received and buffered, and then selected for processing. Some of the states shown in FIG. 9 are typically implemented using multiple states or sub-states.

In state 390 the FSM determines if the message is an L1 miss request, or any another type of high priority message stored in the same high priority inbound message queue. If the message is an L1 miss request, the FSM proceeds to state 392, where it performs the Dtag and L2 tag/state lookup operations in parallel, as described above. Three possible outcomes are shown in FIG. 9, each of which is serviced by a different state of the FSM. If there is no Dtag hit and no L2 hit, then the FSM transitions to state 394, where it performs a main memory access. If there is an L2 hit, but no Dtag hit, then the FSM transitions to state 396, where it performs a main memory access, which typically involves sending a request to a memory controller and waiting for the memory controller to send back the requested cache line. The cache line is then sourced to the L1 cache, preferably bypassing the L2 tag, state and data arrays.

If the there is a DtagHit, the FSM transitions to state 398, where is sends a reply message back to the L1 cache, specifying the location of the synonym that contains the requested cache line. State 398 also causes the L2 cache lookup operation to be aborted so as to prevent the L2 data array from being needlessly accessed and/or to prevent a request from being sent to the memory controller.

The Main L2 FSM, in states 394, 396 and 398 (or in respective states following these states), also performs a Dtag update operation to update the Dtags to reflect the changes that will occur in the L1 cache when the requested cache line is stored in the L1 cache or when the identified synonym is moved from the synonym location to the cache index location associated with the virtual address specified by the processor core.

Not shown in FIG. 9 is an Error state, used for handling the rare (and logically impossible) situation where an Error signal is generated by the Dtag lookup result encoder 374 (FIG. 8A).

L1 Synonym Finite State Machine

Figure 10:
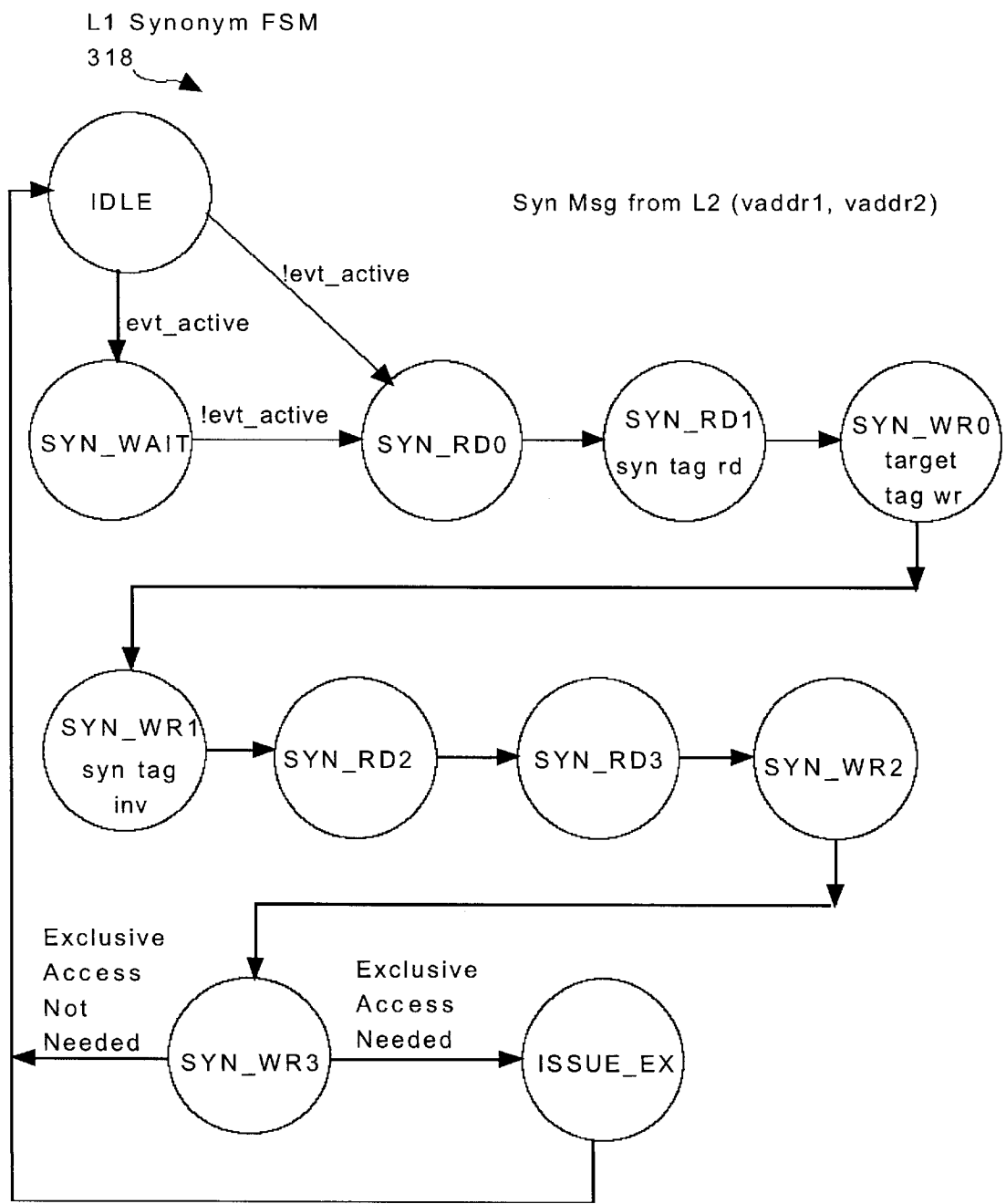
FIG. 10 is a diagram of the L1 Synonym finite state machine.

FIG. 10 depicts a state transition diagram for the L1 Synonym FSM 318. The L1 synonym FSM 318 is activated when the L1 cache receives a synonym reply message from the L2 cache, indicating that the Dtag lookup determined that a synonym of the requested cache line is present in the L1 cache. The reply message includes both the physical memory address, PAddr, for the requested cache line and the VPN bits needed to generate the L1 cache index at which a synonym of the cache line is located. As explained earlier, when the L1 cache miss is first detected, either the virtual address or the virtual cache index at which the request cache line is not found is stored by the L1 cache in the Miss Address buffer 315 (FIG. 4). The virtual address information in Miss Address buffer 315 is used by the Synonym FSM 318 to specify the target cache line to which data from a synonym cache line is to be written.

The L1 synonym FSM 318 generates the cache index of the synonym cache line by concatenating the received VPN bits (in the synonym reply message) with the index bits 382 (FIG. 8B) of the physical address PAddr (also obtained from either the synonym reply message). For clarity, the cache index of the synonym will herein be called the synonym cache index, or CacheIndex1, while the cache index derived from the processor core supplied virtual address will be called either the target cache index, or CacheIndex2. In an alternate embodiment, the L2 cache may generate the CacheIndex1 value and include it in the synonym reply message. In the same alternate embodiment or in another alternate embodiment, the physical address PAddr is not included in the synonym reply message, and instead the physical address PAddr for the synonym operation is obtained solely from the Miss Address buffer 315.

In the exemplary embodiment, it takes four read operations, each of which retrieves 16 bytes of a 64-byte cache line, to read a full cache line from the L1 data array 262 (FIG. 4). It also takes four write operations to write a cache line of information into the L1 data array 262. Of course, the number of reads and writes required to read or write a full cache line will vary from one implementation to another, depending on the cache line width (i.e., the amount of data stored in each cache line) and the width of the data paths within the L1 cache. While transferring information from one cache line to another within the L1 data array, successive quarter portions of the cache line being transferred are temporarily stored in staging buffer 323 (also called the data fill buffer 323, FIG. 4), which has a storage capacity of a half cache line in a preferred embodiment.

Once a synonym reply message has been received the L1 cache, if the L1 cache is active (i.e., processing another request), the L1 synonym FSM is placed in the SYN_WAIT state until the L1 cache is no longer active, at which point the FSM transitions to the SYN_RD0 state. A first portion of the synonym cache line, at CacheIndex1, is read in the SYN_RD0 state, and then a second portion of the synonym cache line is read in the SYN_RD1 state. The two portions of the synonym cache line are temporarily stored in staging buffer 323 (FIG. 4). Also, the tag of the synonym cache line, at CacheIndex1, is read in the SYN_RD1 state and temporarily stored in the A3 buffer 334.

It is noted that once the Synonym FSM 318 reaches the SYN_RD0 state, the FSM then automatically transitions through the states SYN_RD1 to SYN_WR3 in sequence.

After the SYN_RD0 and SYN_RD1 state, the Synonym FSM 318 advances to the SYN_WR0 state, in which it stores the first portion of the synonym cache line in the target cache line, at CacheIndex2. Furthermore, in the SYN_WR0 state, the synonym FSM 318 causes the tag and state of the synonym cache line, obtained from the output of the A3 buffer 334, to be stored in the tag and state arrays 274, 266 at the CacheIndex2 position of those arrays. It is noted that the CacheIndex2 cache index value is obtained by the Synonym FSM from address bits in the Miss Address buffer 315.

In the SYN_WR1 state, the Synonym FSM 318 stores the second portion of the synonym cache line in the target cache line, at CacheIndex2. Furthermore, in the SYN_WR1 state, the synonym FSM 318 causes the tag of the synonym cache line, at CacheIndex1, to be invalidated by setting the state in the state array 266 to the "invalid" state value.

In the SYN_RD2 and SYN_RD3 states, third and forth portions of the synonym cache line, at CacheIndex1, are read and temporarily stored in staging buffer 323 (FIG. 4). Next, in the SYN_WR2 and SYN_WR3 states, the third and forth portions of the synonym cache line are written into the target cache line at CacheIndex2. At this point, the synonym cache line has been completed transferred to the target cache index in the L1 cache data array 262, and the tag and state arrays 274 and 266 have also been appropriately updated to reflect the relocation of the cache line. If the original request from the processor core asked for exclusive access to the specified cache line, but the state of the synonym cache line (at CacheIndex1) was "shared" (and thus not "exclusive"), the Synonym FSM 318 transitions from the SYN_WR3 state to the ISSUE_EX state, where it issues a request for exclusive access to the cache line and then waits until the exclusive access request is granted. In a preferred embodiment, the request for exclusive access to the specified cache line is sent to a cache coherence protocol engine via the ICS 112 (see FIGS. 1 and 4). Upon receiving the grant of exclusive access, the Synonym FSM 318 transitions back to the IDLE state.

If the original request from the processor core did not ask for exclusive access to the specified cache line, or if exclusive access was requested and the L1 cache already had exclusive access to the cache line (i.e., the state of the synonym cache line was "clean_exclusive" or "dirty_exclusive"), then the Synonym FSM 318 transitions from the SYN_WR3 state directly to the IDLE state, indicating that the Synonym transfer operation is complete.

In an alternate embodiment, a state for conditionally initiating a request for exclusive access to the specified cache line is inserted early in the synonym handling sequence, for example immediately after the SYN_RD1 state in which the synonym's tag and state are read. This additional state would be skipped by the Synonym FSM if the original request from the processor core did not ask for exclusive access to the specified cache line, or if exclusive access was requested and the L1 cache already had exclusive access to the cache line. After the SYN_WR3 state, if exclusive access to the specified cache line is needed and the synonym cache line was not in an exclusive state, the next state would be one that waits for receipt of the previously requested exclusive access.

Figure 11A:
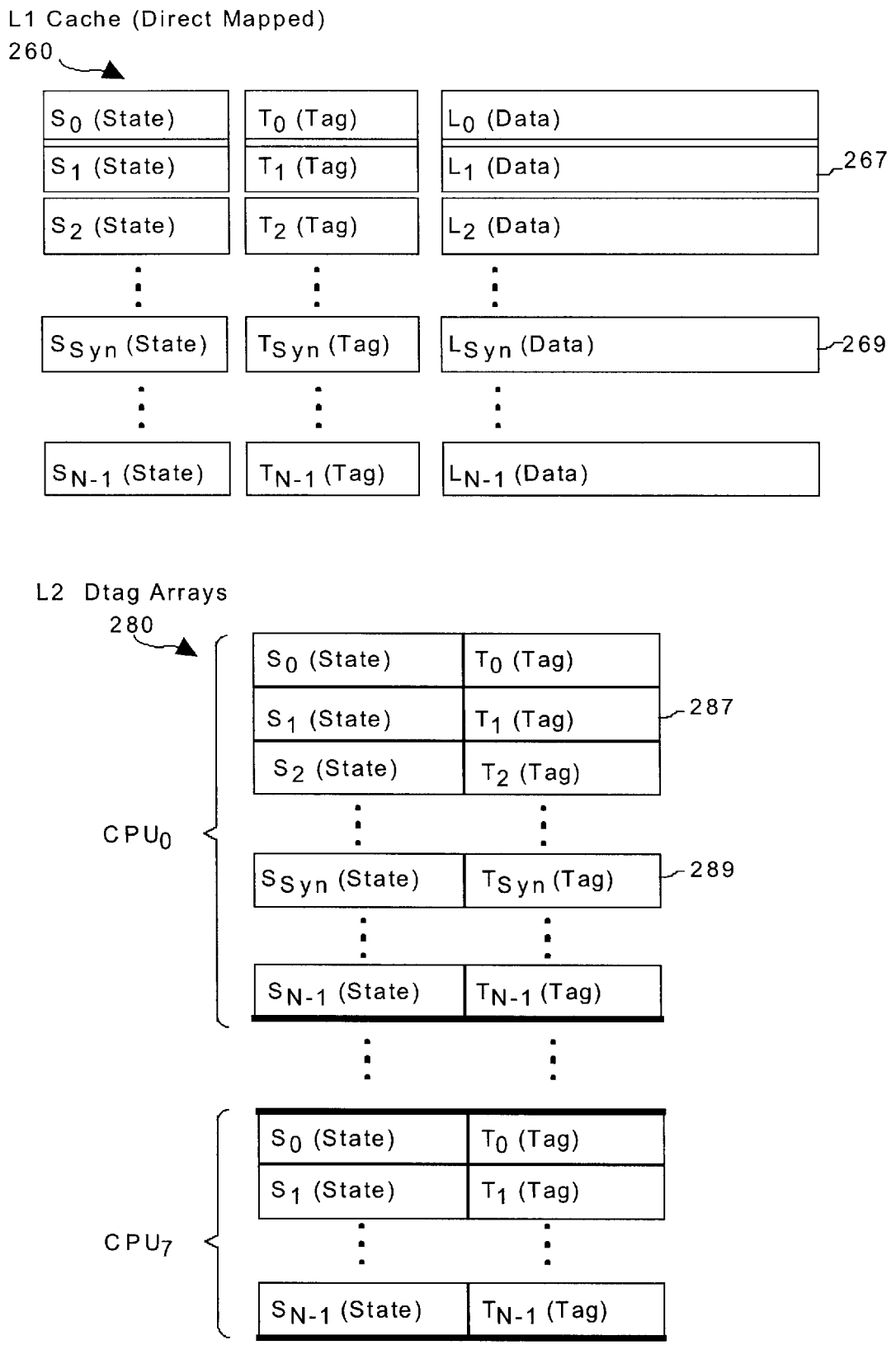
FIGS. 11A and 11B depict the L1 and L2 caches before and after a synonym is resolved in accordance with this invention.
Figure 11B:
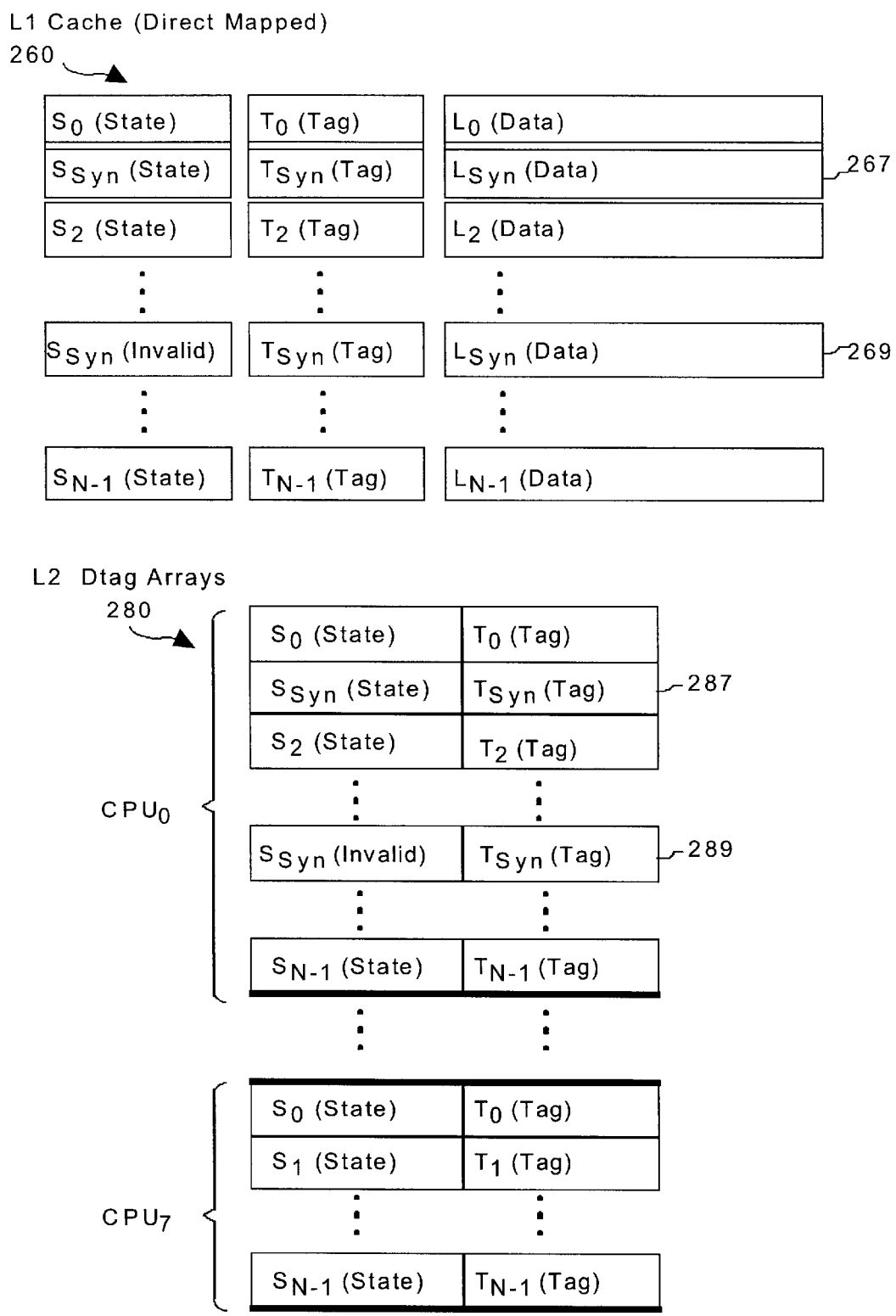

The changes to the L1 cache and the L2 Dtag arrays are illustrated in FIGS. 11A and 11B. FIG. 11A includes an illustration of a direct mapped L1 cache 260 with a synonym cache line 269 that corresponds to a targeted cache line 267, and L2 Dtag arrays with the synonym entry 289 corresponding to the targeted entry 287. FIG. 11B illustrates the L1 cache and L2 Dtag arrays after the synonym is found, using the Dtag arrays, and copied to the target cache line. In the L1 cache, the contents of the synonym cache line 269 have been copied into the targeted cache line 267 and the synonym cache line 269 has been invalidated. These changes are also reflected in the targeted entry 287 and the synonym entry 289 in the L2 cache.

Protocol Engines

Figure 12A:
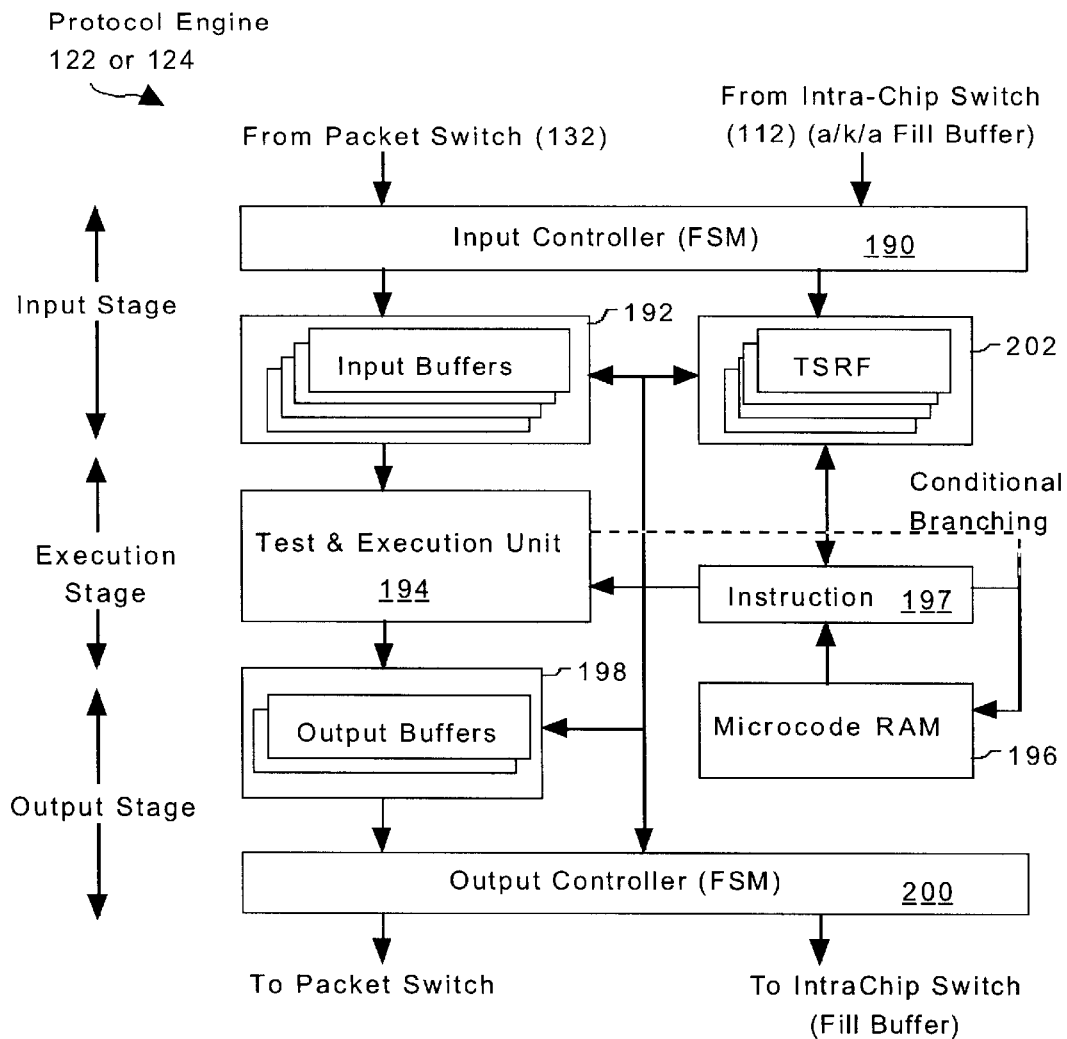
FIGS. 12A, 12B, 12C and 12D depict a protocol engine.

The basic architecture of each of the protocol engines 122, 124 (FIG. 1) is shown in FIG. 12A. The protocol engines are responsible for handling memory transactions, such as the sharing of cache lines, the exclusive assignment of a cache line to a processor in a particular node of the system, remote read and write operations. The protocol engines 122, 124 are responsible for maintaining cache coherence of cache lines among the nodes 102, 104 of the multiprocessor system 100.

Each of the protocol engines 122, 124, as shown in FIG. 12A, includes an input controller 190, preferably implemented as a finite state machine used in connection with a set of input buffers 192 for receiving data (inbound messages) from the ICS 112 and the PS 132. Received messages, some of which include a full cache line of data and the associated parity bits, are stored in the input buffers 192. In a preferred embodiment, sufficient input buffers 192 are provided to store inbound, received data for up to sixteen ongoing memory transactions. A test and execution unit 194 (herein called the execution unit) executes instructions obtained from an instruction memory 196, also called the microcode array, so as to advance memory transactions, also called cache coherence transactions. The currently selected instruction, obtained from the instruction memory 196, is held in a current instruction buffer 197 for decoding and execution by the execution unit 194. Output messages generated by the execution unit 194 are stored in a output buffers 198, the operation of which are controlled by an output controller 200, preferably implemented as a finite state machine. The output messages are transferred from the output buffers 198 to specified destinations within the same node 102, 104 as a protocol engine 122, 124 via the ICS 112 or to specified destinations within other nodes 102, 104 of the multiprocessor system 100 via the PS 132.

While the processor nodes 102 and I/O nodes 104 of a preferred embodiment use two protocol engines, including a home protocol engine (HPE) 122 (FIG. 1) for handling memory transactions where the node 102, 104 in which the protocol engine 122 resides is the home of the memory line that is the subject of the memory transaction, and a remote protocol engine (RPE) (124, FIG. 1) for handling memory transactions where a remote node 102, 104 is the home of the memory line that is the subject of the memory transaction, for most purposes the two protocol engines 122, 124 may be considered to be logically a single protocol engine.

Figure 12B:
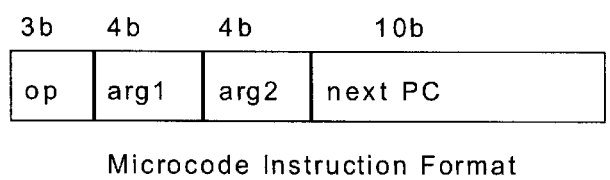

FIG. 12B shows the format of each of the instructions stored in the instruction memory 196 and instruction buffer 197. As shown, each instruction includes an operator, two operands, and a next program counter field. The operator indicates the type of operation to be performed by the execution unit 194 when executing the instruction, the two operands provide parameters that affect the execution of an instruction.

The current state of multiple memory transactions is stored in a set of registers collectively called the Transient State Register File (TSRF) 202. These memory transactions include zero or more externally initiated memory transactions and zero or more internally initiated transactions, initiated by external and internal requests. Each memory transaction has a memory line address (sometimes called the global memory address) that identifies the memory line that is the subject of the memory transaction. More specifically, the memory line address identifies the node 102, 104 that interfaces with the memory subsystem 123 that stores the memory line (i.e., the home node) and a specific position within the memory subsystem 123 of the memory line. In a preferred embodiment, the top M (e.g., 10) bits of the memory line address identify the home node 102, 104 of the memory line, while the remainder of the address bits identify the memory line within the identified node. In a preferred embodiment, the memory line address for a memory line does not include any of the address bits used to identify sub-portions of the memory line, such as individual 64-bit words of individual bytes within the memory line. However, in other embodiments that support transactions on sub-portions of memory lines, the memory line addresses used may include bits for identifying such memory line sub-portions.

Figure 12C:
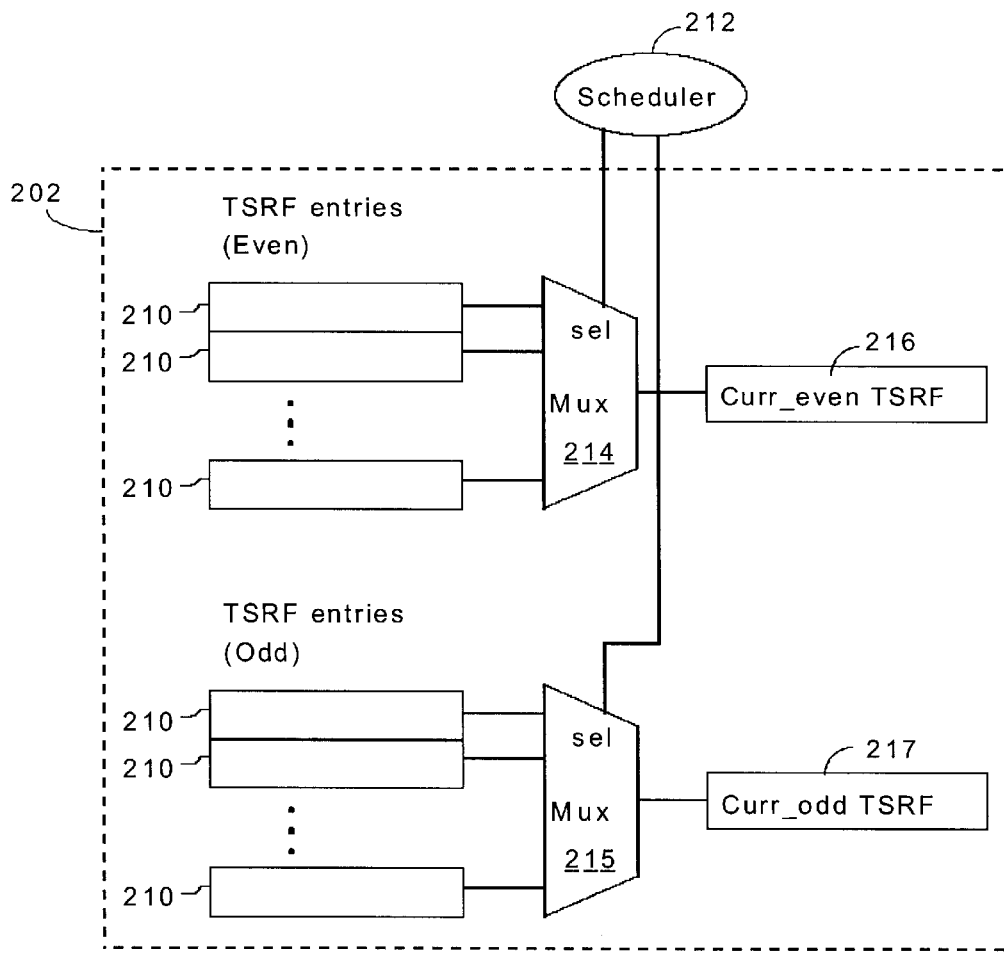

Referring to FIG. 12C, each memory transaction has a respective entry 210 stored in the Transient State Register File (TSRF) 202 that indicates the state of the memory transaction. In a preferred embodiment, the TSRF 202 has registers for storing sixteen entries 210 as well as access circuitry for reading and updating the contents of the TSRF entries 210. Obviously the number of entries in the TSRF 202 is a design choice that will vary from one implementation to another. Typically, the TSRF 202 will include at least as many entries as the number of PCs 106 included in a processor node 102.

The entries 210 of the TSRF 202 are divided into two groups—"even" TSRF entries 210 and "odd" TSRF entries 210. The "even" TSRF entries 210 are used for memory transactions associated with memory lines that have "even" memory line addresses (i.e., memory line addresses ending in a "0" bit), while the "odd" TSRF entries 210 are used for memory transactions associated with memory lines that have "odd" memory line addresses (i.e., memory line addresses ending in a "1" bit).

Figure 12D:
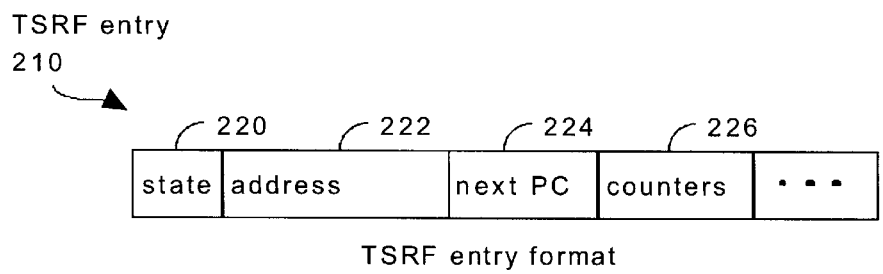

Referring to FIG. 12D, each TSRF entry 210 includes many fields, a small subset of which are identified and described below:

a state field 220: indicates the state of the associated memory transaction if any;

an address field 222: stores the memory line address associated with a memory transaction if any;

a next program counter field 224: identifies the next instruction to be executed by the execution unit when certain preconditions required for continued execution of the memory transaction are satisfied; and a set of counter fields 226: are used to store count values that, for example, control repeated execution of an instruction (e.g., when a transaction needs to send out N identical protocol messages to other nodes 102, 104, one of the counter fields 226 is initially to a value corresponding to N, and is then decremented or incremented after each execution of the instruction until a predefined terminal count value is reached, at which point the memory transaction is either complete or a next program counter for the transaction is determined). The counter fields 226 and the state field 220 together form an overall or more specific state of an associated memory transaction.

In a preferred embodiment, the set of defined states for the state field 220 include:

vacant (also called invalid): indicates that the TSRF entry 210 does not store information related to a memory transaction;

active: indicates that the associated memory transaction is available for scheduling/execution;

running: indicates that the associated memory transaction is currently running (i.e., is currently being executed by the execution unit 194, or was the transaction for which an instruction was executed during the last available even or odd execution cycle);

waiting: indicates that the associated memory transaction is stalled/deferred, waiting for a protocol message from another node 102, 104 to be delivered via the PS 132;

local_waiting: indicates that the associated memory transaction is stalled, waiting for a protocol message from within the same node 102, 104 to be delivered via the ICS 112; and suspended: indicates that the associated memory transaction is suspended because there is a memory address conflict with a previously allocated memory transaction having the same memory line address.

Detecting and Resolving Races within a Node

Overview of Race Conditions and "Stale Requests"

As noted above, and referring to FIGS. 1 and 6, cache line misses in the L1 cache 108, 110 are first directed to a L2 cache 116 (FIG. 1), which attempts to satisfy the miss locally (i.e., from the memory lines of information stored in the L2 cache 116 or the local memory subsystem) whenever possible. When the L2 cache controller 116 is unable to satisfy the request locally, the control logic of the L2 cache (sometimes hereinafter called the L2 cache controller) forwards the request to a protocol engine 122, 124 after storing memory transaction information in a pending transaction buffer 406 (FIG. 6) of the L2 cache 116. The L2 cache's control logic uses this information to resume the memory transaction when it receives a response from the protocol engine 122, 124. The protocol engine 122, 124 also issues requests to the L2 cache 116 to satisfy requests that originate from other nodes 102, 104.

When exchanging protocol messages, the protocol engine 122, 124 and the L2 cache controller 116 use at least two priority lanes (e.g., high and low) to avoid deadlock. In particular, requests sent by a L2 cache controller 116 to a protocol engine 122, 124 use a lower priority lane, while replies to requests sent by the L2 cache controller 116 to the protocol engine 122, 124 use a higher priority lane.

The interaction between the protocol engine 122, 124 and the L2 cache controller 116 creates a number of race cases. When such race cases occur, the protocol engine 122, 124 wins the races in preferred embodiments of the present invention. In other words, a request sent by the protocol engine 122, 124 is processed, but a request sent by the L2 cache controller 116 may or may not be processed at all, or the request from the L2 cache controller may be modified before it is processed to take into account the processing of a related request from the protocol engine 122, 124.

One such race case arises when a protocol engine receives from a L2 cache controller 116 a request concerning a particular memory line while waiting for a response to its own request (i.e., a request sent by the protocol engine 122, 124 to a L2 cache controller 116) concerning the same memory line of information. Briefly, a protocol engine 122, 124 is able to detect this race case because of information retained in a Transient State Register File (TSRF 202, FIG. 12A). More specifically, the TSRF 202 includes entries for requests sent and received by a protocol engine 122, 124. When, for example, a protocol engine 122, 124 receives a request from a L2 cache controller 116, the protocol engine scans the TSRF to determine if the protocol engine 122, 124 is waiting for a response to a request concerning the same memory line. If the protocol engine 122, 124 detects a match, it marks the request from the L2 cache controller as stale.

Another race case occurs when a protocol engine 122, 124 receives from a L2 cache controller a response to an earlier protocol engine request, and then receives a request that the L2 cache controller transmitted prior to the response. As noted above, the output buffer 162 (FIG. 2) receives messages (e.g., requests, responses, etc.) from a L2 cache 116 for transmission to the ICS 112 and supports multiple priority lanes. But the output buffer 162 does not always transfer messages from the L2 cache controller 116 to the ICS 112 in the order in which the output buffer 162 receives the messages because of the multiple priority lanes. Specifically, if a high priority message is available, the output buffer 162 transmits the high priority message before a low priority message even if the output buffer 162 receives the low priority message before the high priority message. Preferably, the output buffer 162 detects this race case. Briefly, the output buffer 162 includes logic to do a memory-line-address comparison each time the output buffer 162 transmits a high priority message to the ICS 112. More specifically, the output buffer 162 compares the address of a memory line that is the subject of a high priority message to the address of the memory line of information that is the subject of each low priority message currently stored by the output buffer 162. If the output buffer 162 detects a match, the output buffer 162 marks the matching low priority request as stale.

Yet another race case occurs when a protocol engine 122, 124 receives a request (i.e., a low priority message) from the L2 cache controller 116 and then a response (i.e., high priority message) from the L2 cache controller 116, but processes the response before the request. This can occur because a protocol engine 122, 124 preferably includes input buffers 192 that store received messages (i.e., requests and responses) until they are processed by the protocol engine. The protocol engine, moreover, is preferably configured to process messages based on their type and their associated priority, as opposed to the order in which they are received. So when a protocol engine 122, 124 processes a response stored in an input buffer 192, the protocol engine scans the input buffers 192 to determine if a request concerning the same memory line as the response is stored in an input buffer 192. If so, the protocol engine 122, 124 marks the request as stale.

As indicated above, the mechanism by which such race cases are detected is based on the concept of a stale request. More specifically, race conditions result in a request from a L2 cache controller 116 that is an element of a race condition being designated as stale. Again, a protocol engine 122, 124 always wins these races and, therefore, requests from a protocol engine 122, 124 are not designated as stale.

When a protocol engine 122, 124 processes a stale request (regardless of whether the protocol engine 122, 124 or the output buffer 162 designated the request as stale), the protocol engine 122, 124 consults the L2 cache controller 116 to determine whether the stale request is still valid. In other words, the protocol engine 122, 124 requests additional processing instructions from the L2 cache controller regarding the stale request.

The L2 cache controller 116 responds to a request for additional processing instructions by determining whether the stale request is consistent with the current state of the memory line that is the subject of the stale request. For instance, the request from a protocol engine 122, 124 that is an element of a race condition may have resulted in the modification of the state of the memory line such that the stale request is no longer necessary, accurate, etc.

For example, if the request from the protocol engine 122, 124 is a write-back, the L2 cache controller need not send a request (via a protocol engine 124) to another node 102, 104 in order to obtain an up-to-date copy of the memory line that is the subject of the write-back. Thus, if the stale request is for an up-to-date copy of the memory line of information, the L2 cache controller 116 instructs the protocol engine 124 to discontinue processing the stale request. Other examples of how stale requests from an L2 cache controller are handled are discussed below with respect to FIGS. 13A–13C.

Additionally, a response by the L2 cache controller 116 to the request for further processing instructions is preferably a high priority message, which guarantees that the response makes forward progress.

Furthermore, the protocol engine 122, 124 and the output buffer 162 in some embodiments of the present invention identify stale requests through only a partial match of the address of the memory line that is the subject of the stale requests. Using a partial match reduces the complexity of the detection circuitry and logic that identifies the matches. But because only part of the address is used, multiple memory lines of information effectively have the same address and false positives (inaccurate matches) are possible. Still, the L2 cache controller 114 responds to false positives and true positives in the same manner. Specifically, the L2 cache controller 114 determines whether the "stale" request is inconsistent with the current state of the memory line. If the stale designation is indeed a false positive, the current state of the memory line will be consistent with the "stale" request and the L2 cache controller 114 will direct the PE to proceed. Because false positives are rare and the resources used by the L2 cache controller's 114 response limited, using partial address matches still achieves operational efficiencies.

Output Buffer in For Intra-Chip Switch Interface

Figure 12E:
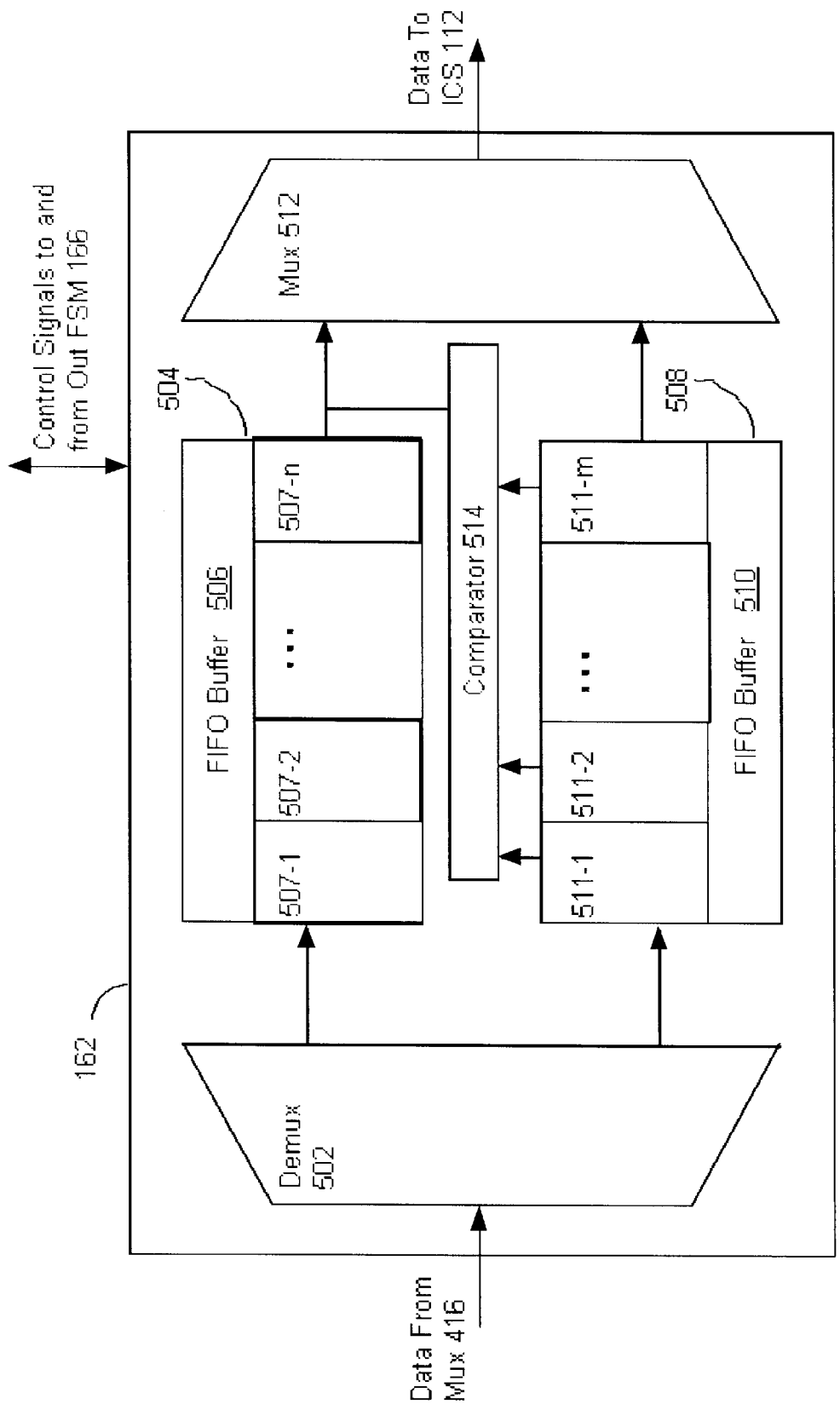
FIG. 12E illustrates an output buffer consistent with a preferred embodiment of the present invention.

Attention now turns to a more detailed description of the output buffer 162, as illustrated in FIG. 12E. As noted above and illustrated in FIG. 6, an output buffer 162, which the Out FSM 166 controls, receives messages from a multiplexer 416 in the L2 cache, which receives messages from the L2 cache controller 116. More specifically, a demultiplexer ("demux") 502, an internal component of the output buffer 162, receives messages from the multiplexer 416.

The demultiplexer 502 distributes the messages to either a high priority lane 504 or a low priority lane 508. As noted above, the present embodiment is limited to two priority lanes; however, the invention is not so limited. Thus, in other embodiments of the present invention the output buffer 162, and nodes 102, 104 in general, support additional priority lanes. When selecting a priority lane 504, 508, the demultiplexer 502 references the content of the messages it processes. More specifically, the messages each include a command or transaction type indicator, which the demultiplexer 502 uses to select a priority lane. In the present embodiment the command or transaction type identifies the message as a response to a request, which are preferably high priority messages, or a request, which are preferably low priority messages.

Each of the priority lanes 504, 508, is preferably implemented as a first-in-first-out (FIFO) buffer 506, 510. The precise number of messages (i.e., the number of internal stages 507, 111 in the FIFO buffers 506, 510) that can be stored in each priority lane capacity is not critical to the present invention, and further the sizes of the two FIFO's need not be the same. Instead, these details are viewed as design choices dependent upon the amount and type of message traffic passing through the output buffer 162.

After removing a message from a priority lane 504, 508, the corresponding FIFO buffer 506, 510 outputs a signal indicating whether the FIFO buffer contains any additional messages. A multiplexor 512 latches a message from either the high priority lane 504 or the low priority lane 508. As noted above, the high priority messages are selected ahead of low priority messages, and therefore the multiplexer 512 is configured to select and latch high priority messages until none are available. The multiplexer 512 then selects low priority messages from the low priority lane 508 (i.e., the low priority FIFO buffer 510) until another high priority message becomes available in the high priority lane 504 (i.e., the high priority FIFO buffer 506). In some embodiments of the present invention, messages are "aged," for example by counting the number of high priority messages sent through the multiplexer 512 while the low priority lane contains at least one message, detecting when the count reaches a predefined threshold value, and then sending a low priority lane message through the multiplexer 512 and resetting the count. This aging process ensure forward progress for low priority messages because at some point all low priority messages are processed. As a result, if a particular low priority message is sufficiently aged, this low priority message will be selected ahead of high priority messages.

Also illustrated in FIG. 12E is a comparator 514, which determines whether a request in the low priority lane 508 is stale. More specifically, the comparator 514 latches information from each high priority message selected by the multiplexer 512. This information preferably includes the address, or at least a portion of the address, of the memory line 184 that is the subject of the high priority message. The comparator 514 compares this information to equivalent information latched from each low priority message, if any, stored in the low priority lane 508 while the comparator latches the high priority message. If a match is found, the matching low priority message is designated as stale by the comparator 514. More specifically, the comparator 514 modifies the contents of the matching low priority message to indicate that the message is stale. In some embodiments, a bit of information in each message indicates whether a give message is stale. For example, if this bit is set to zero, the message is not stale. Conversely, if the bit is set to one, the message is stale.

How the output buffer 162 fits into the present invention is described below with reference to FIG. 15.

Race Condition Resolution Methodologies

Attention now turns to a detailed description of processing steps used in a preferred embodiment of the present invention. As a preliminary matter, while the processing steps described in FIGS. 13A, 13B, 14A–14C, and 15 are numbered, the various steps taken by a protocol engine 122, 124, a L2 cache controller 116, and the output buffer 162 do not necessarily occur in the precise order illustrated. For example, the first numbered processing step relates to a protocol engine 122, 124 receiving a request from another node; however, it is possible that a L2 cache controller 116 will receive a request from the L1 cache 108, 110 first. Additionally, the steps are ordered such that the various race conditions that can occur, are likely to occur. The processing steps are described with these qualifications.

Figure 13A:
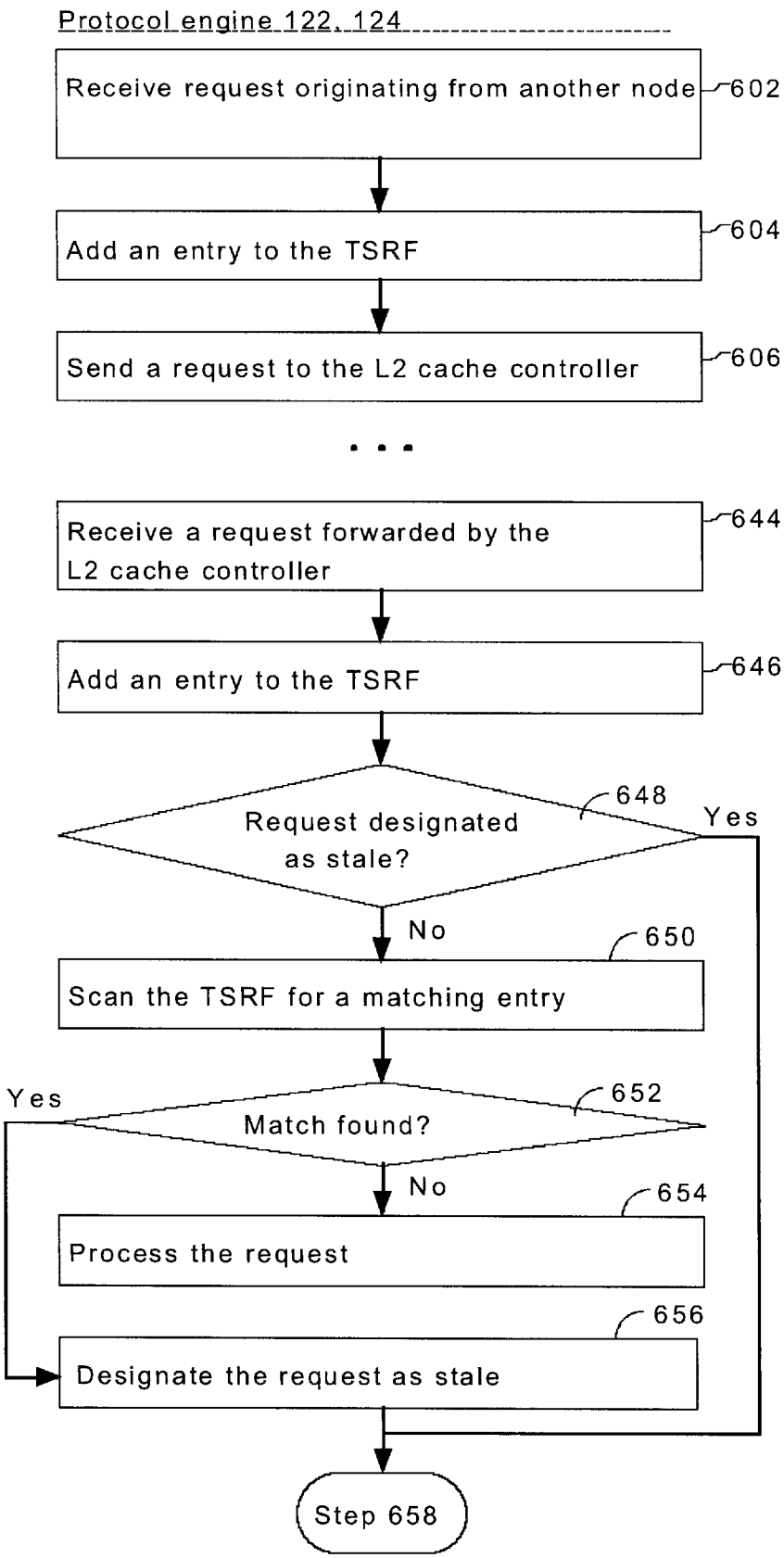
FIGS. 13A, 13B, and 13C illustrate processing steps a protocol engine uses in a preferred embodiment of the present invention to communicate with a second-level cache controller.

In a first processing step, a protocol engine receives a request originating from another node 102, 104 (i.e., selects the request from an input buffer 192 for processing) (FIG. 13A, step 602). As described above and in U.S. patent application bearing Ser. No. 09/878,982 and incorporated herein, nodes 102, 104 exchange protocol messages in order to share memory lines. Accordingly, a protocol engine 122, 144 must often respond to requests from other nodes 102, 104.

In response, the protocol engine 122, 124 creates an entry in the TSRF 202 (FIG. 12A) corresponding to the request (step 604). This entry includes information about the request, and allows the protocol engine 122, 124 to continue processing the request after the protocol engine 122, 124 receives a related message from the L2 cache controller 116. More specifically, this entry permits the protocol engine 122, 124 to temporarily discontinue the processing of the request received in step 602. When the protocol engine 122, 124 subsequently receives a message related to the request received in step 602, the protocol engine scans the TSRF 202 for matching entries (i.e., an entry concerning the same memory line and requiring the received message to advance to a next state). Note however, that a request is sometimes processed until completion. If so, the protocol engine 122, 124 preferably updates the TSRF 202 entry as the processing of the request progresses, but ultimately deletes the TSRF 202 entry without ever having discontinued the processing of the message.

The protocol engine 122, 124 then sends a request to the L2 cache controller 116 (step 606). The protocol engine 122, 124 does not directly access cached memory lines or manipulate the state of the memory lines. Instead, the L2 cache controller 116 does this in response to requests from the protocol engine 122, 124. Thus, if a request received from another node 102, 104 is a read-exclusive request (i.e., a request for exclusive ownership of the memory line and a copy of the memory line), the L2 cache controller 116 may provide a copy of the memory line that is the subject of the request to the protocol engine 122, 124 (in the form of a response message) and modify the state of the memory line accordingly (i.e., to indicate that the node from which the read-request originated is the exclusive owner of the memory line). The protocol engine 122, 124 then forwards the copy of the memory line to the other node 102, 104 that requested an exclusive copy of the memory line, as described below.

Figure 14A:
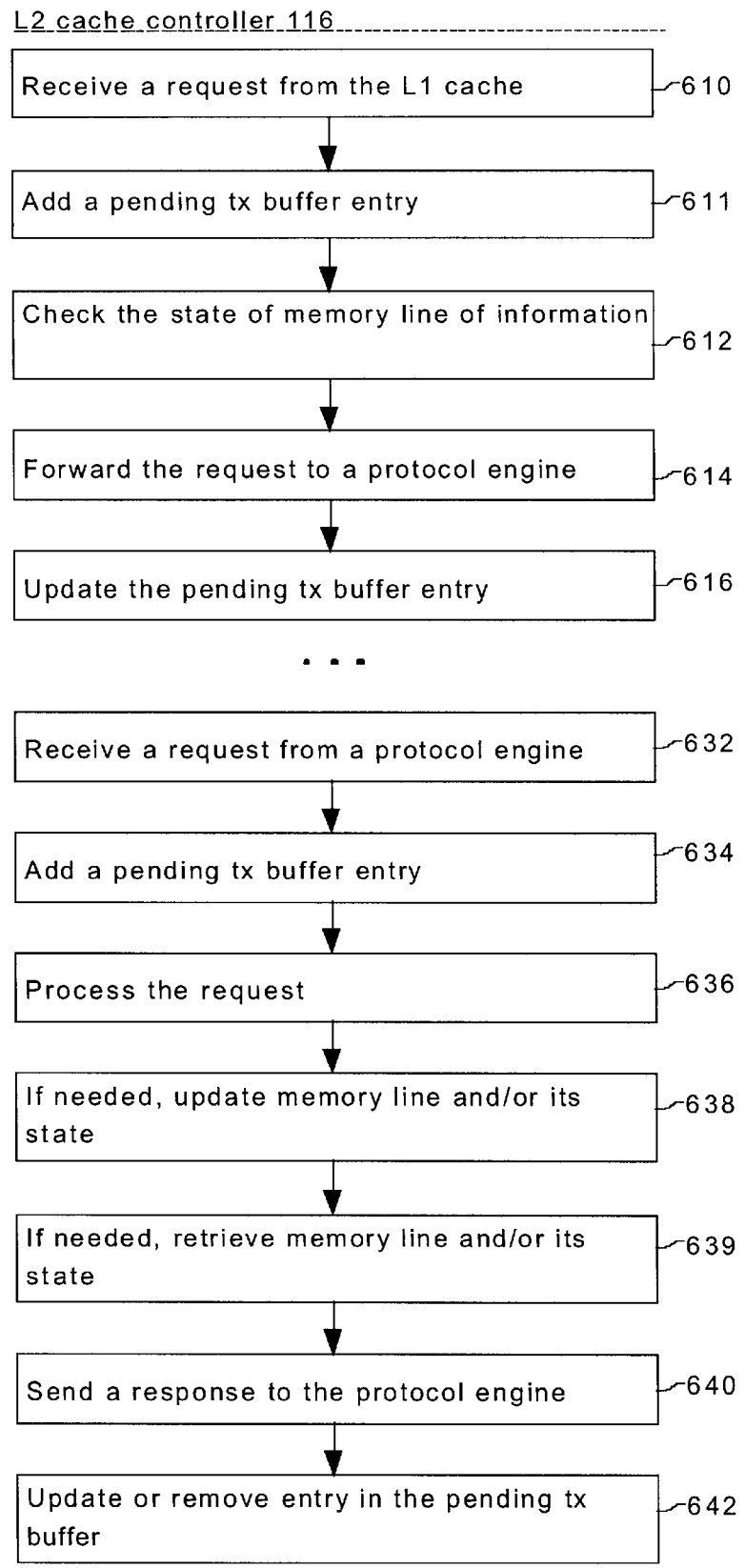
Figure 14B:
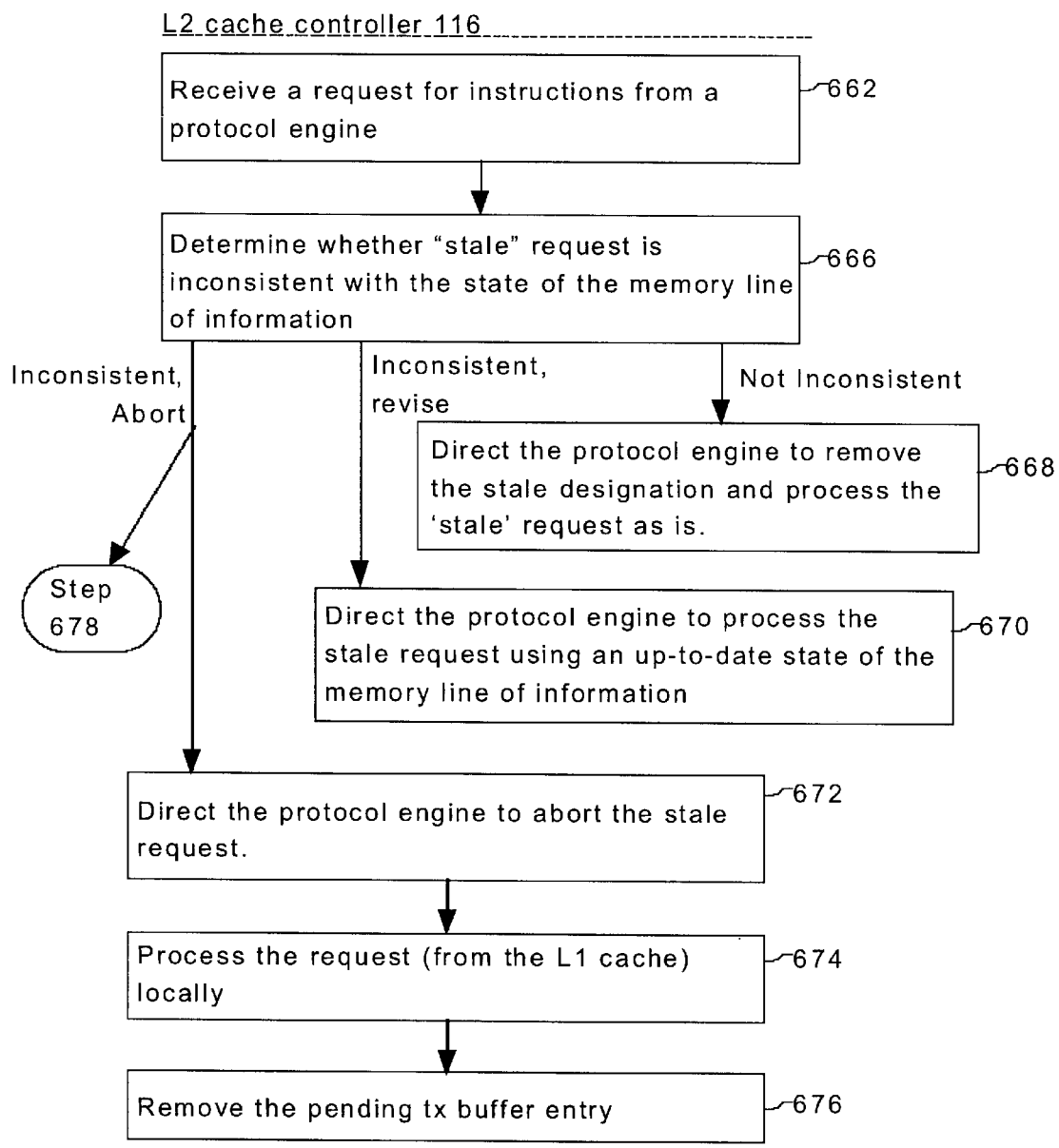

At the around the same time as the protocol engine 122, 124 executes steps 602–606 or at least before the L2 cache controller processes the request sent in step 606, the L2 cache controller 116 receives a request from the L1 cache 108, 110 (step 610, FIG. 14A).

The L2 cache controller 116 responds by adding an entry to a pending transaction buffer 406 (FIG. 6) (step 611). The pending transaction buffer 406 is essentially the same as the TSRF 202 (FIG. 12A) except that the L2 cache controller 116 uses it instead of a protocol engine 122, 124. Thus, the L2 cache controller 116 uses the pending transaction buffer 406 to store information about requests so that it can continue processing a request when the L2 cache controller 116 subsequently receives a related message.

The L2 cache controller 116 then checks the state of the memory line that is the subject of the request received in step 610 to determine if it requires interaction with a protocol engine 122, 124 (step 612). For example, if the local memory subsystem 123 stores the memory line and the state indicates that another node 102, 104 does not share or exclusively own the memory line, the L2 cache controller 116 does not need to interact with a protocol engine 122, 124 to satisfy the request submitted by the L1 cache 108, 110. This is a situation that does not call for the present invention. As noted above, the present invention concerns race conditions that arise during interactions between a protocol engine 122, 124 and a L2 cache controller 116.

If, however, the local memory subsystem 123 does not store the memory line or the state indicates that another node 102, 104 shares or exclusively owns the memory line, the L2 cache controller 116 sends a corresponding request to a protocol engine 122, 124 (step 614). For example, the request may be for exclusive ownership of the memory line. Thus, if the state indicates that one or more nodes 102, 104 are sharing the particular memory line, the L2 cache controller 116 directs the protocol engine 122, 124 to send invalidation requests to these nodes. Requests received from L1 cache 108, 110 generally require the L2 cache controller 116 to include an identifier of one or more other nodes 102, 104 (e.g., one or more other nodes sharing a particular memory line) in corresponding requests sent to a protocol engine 122, 124. Accordingly, the L2 cache controller preferably includes a portion of the state of the memory line, as it exists when the L2 cache controller 116 sends the request to the protocol engine, in the request.

The L2 cache controller 116 then updates the entry added to the pending transaction buffer 406 in step 611 to reflect that current status of the request (step 616). This entry now enables the L2 cache controller 116 to continue processing the request when it receives a response from the protocol engine 122, 124. In particular, this entry now requires a response from the protocol engine 122, 124 in order to advance the state of the request (i.e., memory transaction).

Importantly, the L2 cache controller 116 does not modify the state of the memory line that is the subject of the request received in step 610. Instead, the L2 cache controller 116 is configured to defer this step until it receives a response from the protocol engine 122, 124. The L2 cache controller is configured in this way, in part, to enable the protocol engine 122, 124 to always win in cache coherence protocol race cases.

The output buffer 162 (FIG. 6) of the L2 cache controller receives the message (i.e., request) sent by the L2 cache controller 116 in step 614 (FIG. 15, step 618) after it passes through a one or more elements (e.g., multiplexer 414, temporary data buffers 408, and/or multiplexer 416) of the present node 102, 104.

Figure 15:
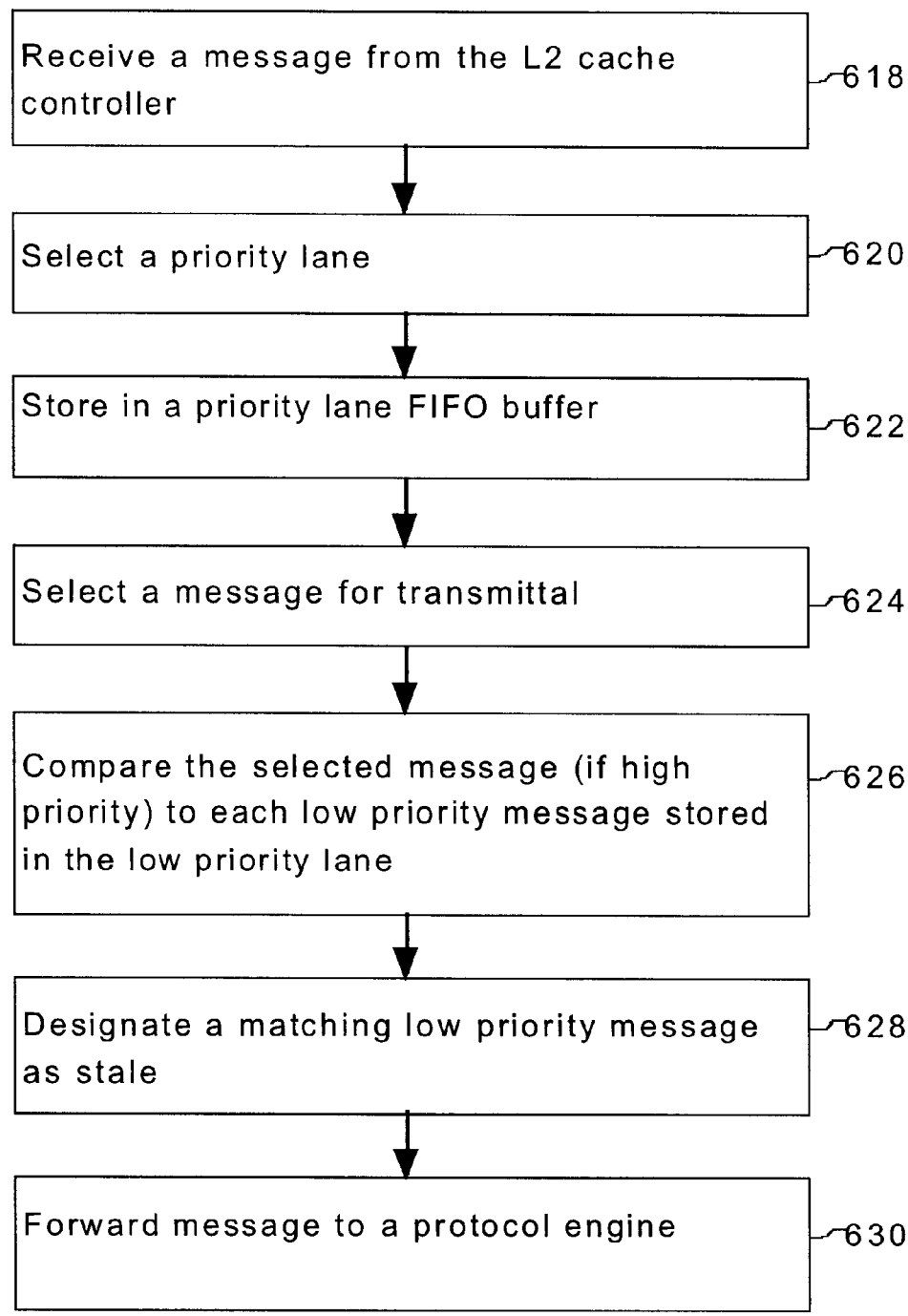
FIG. 15 illustrate processing steps an output buffer uses in a preferred embodiment of the present invention to communicate with a protocol engine and a second-level cache controller.

The demultiplexer 502 (FIG. 12E) included in the output buffer 162 selects a priority lane 504, 508 by reference to a message type preferably included in the message (step 620, FIG. 15). As noted above, the message is a request, and thus a low priority message, so the demultiplexer 502 selects the low priority lane 508.

Based on the selection in step 620, the message is placed in a priority lane FIFO buffer 506, 510 (step 622). Again, the low priority lane 508 is selected because the message is a request. The FIFO buffer in which the output buffer 162 stores the message is, therefore, the low priority FIFO buffer 510.

As the message (i.e., request) moves through the low priority lane 508, another multiplexer 512 connected to an output of each priority lane selects a message from either the high priority lane 504 or the low priority lane 508 (step 624).

If a message is selected from the high priority lane 504, a comparator 514 included in the output buffer 162 latches information from the selected message and each message, if any, included in the low priority lane 508 to determine if the high priority message and any of the low priority messages concern the same memory line (step 626).

If so, the comparator modifies the matching low priority message to indicate that it is stale (step 628). Further, the multiplexer 512 forwards the selected message to a protocol engine via the ICS 112 (step 630).

As noted above, a protocol engine 122, 124 sent a request to the L2 cache controller in step 606 (FIG. 13A). The L2 cache controller 116 receives this request in step 632 (FIG. 14A).

The L2 cache controller 116 responds by adding an entry to the pending transaction buffer 406 (step 634, FIG. 14A). This entry includes information sufficient to, for example, permit the L2 cache controller 116 to continue processing the request should the L2 cache controller begin processing another message before completely processing this message.

Eventually, the L2 cache controller 116 processes the request received in step 632 (step 636). The precise steps taken depend on the nature of the request. Some requests require the L2 cache controller 116 to obtain (and send to the requesting protocol engine) a copy of the memory line from the local memory subsystem 123 or L2 data array 292 and the memory line's state and sharer information, but not to update the content of the memory line or its state and sharer information. Other requests require to L2 to obtain and send to the protocol engine a copy of the state and sharer information for a memory line of information, but not to update the memory line or its state and sharer information. Still other protocol engine requests require the L2 cache controller to update the content of the memory line or its state and sharer information.

If the request from the protocol engine is one that requires the state of a memory line of information to be updated, the L2 cache controller 116 updates the state of the memory line that is the subject of the request from the protocol engine 122, 124 (step 638). If the request from the protocol engine requires the content of a memory line and/or its state and sharer information to be retrieved, the L2 cache controller does so (step 639). The L2 cache controller 116 then sends a response to the protocol engine 122, 124 (step 640). If the response by the L2 cache controller concludes the transaction, then it removes the entry added to the pending transaction buffer 406 in step 634 (step 642). However, in some instances the transaction is not complete until an additional request is received from the protocol engine and the L2 cache controller responds to that additional request. In these cases, the entry in the pending transaction buffer is updated, but not deleted (step 642).

Again, the output buffer 162 receives this message (i.e., response) from the L2 cache controller 116 and processes the message as described above. However, in this instance, the message is a high priority message. Accordingly, and as indicated above, the output buffer 162 may transmit the response sent in step 640 before the request sent in step 614. If so, the output buffer 162 (i.e., the comparator 514) designates the request sent in step 614 as stale.

In step 644 (FIG. 13A), a protocol engine 122, 124 receives a request sent by the L2 cache controller 116, such as a request sent in step 614 of FIG. 14A (i.e., selects the request from an input buffer 192 for processing).

The protocol engine 122, 124 responds by adding an entry corresponding to the request in the TSRF 202 (step 646). Again, this entry includes information about the request, and allows the protocol engine 122, 124 to continue processing the request after it subsequently receives a related message. Additionally, this information includes status information such as a stale designation, which the output buffer 162 makes in the embodiment of the present invention.

If the information does not indicate that the request is designated as stale (step 648-No), the protocol engine 122, 124 scans the TSRF 202 for entries that match the entry added in step 646 (step 650). More specifically, the protocol engine 122, 124 determines if any of the other entries in the TSRF 202 concern the same memory line that is the subject of the request received in step 644. Typically, the protocol engine 122, 124 makes this determination by checking an identifier of the memory line included in each entry of the TSRF 202. Additionally, the identifier is preferably the physical address of the memory line in a memory subsystem 123.

If a match is not found (step 652-No), the protocol engine 122, 124 processes the request (step 654). Again, requests from the L2 cache controller 116 typically require the protocol engine 122, 124 to interact with other nodes 102, 104 in the multiprocessor system 100.

If a match is found (step 652-Yes), the protocol engine designates the request as stale (step 656). This includes modifying the TSRF 202 entry corresponding to the request. Thus, when the protocol engine 122, 124 subsequently sends a message (e.g., a request or a response) in connection with this entry, the message reflects the stale designation.

Figure 13B:
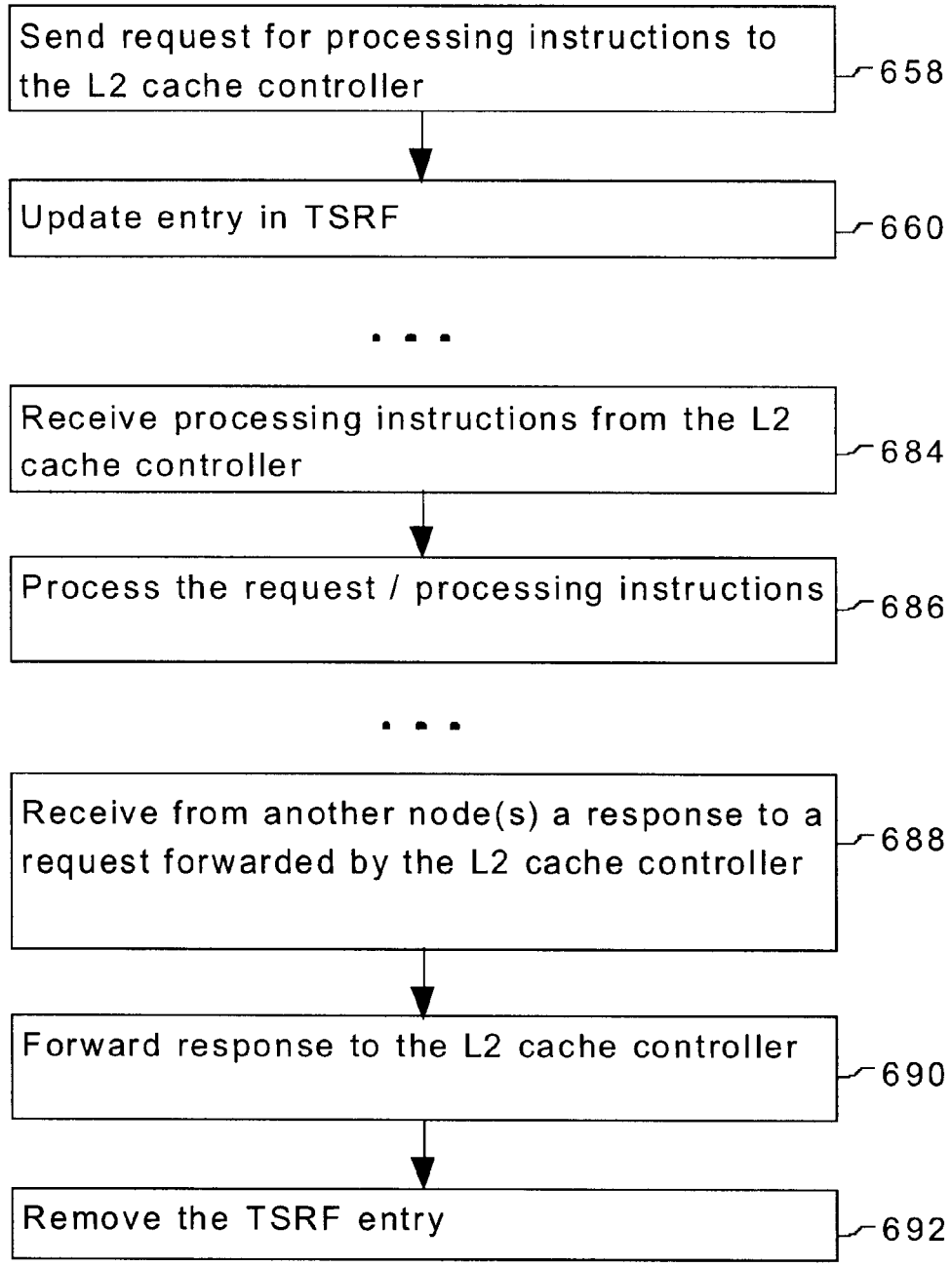

After designating the request as stale (step 656) or if the request was already designated as stale (step 648-Yes), the protocol engine 122, 124 sends a request for further processing instructions to the L2 cache controller 116 (FIG. 13B, step 658). The request preferably includes the entire identifier included in the request received in step 644 and the identifier included in the matching entry included the TSRF 202.

Because the request is stale, the request may no longer be consistent with the current state of the memory line that is the subject of the request received in step 644. In other words, the L2 cache controller 116 may have altered the state of the memory line in a way that affects the validity or necessity of the request received in step 644. On the other hand, the designation of the request as stale may be a false positive (e.g., because the address comparison for detecting "stale" requests may be the result of a partial memory line address comparison). If so, the request received in step 644 remains consistent with the state of the memory line.

The protocol engine then updates the entry added to the TSRF 202 in step 646 to reflect the current status of the request (step 660). Essentially, the entry now requires the receipt of additional processing instructions from the L2 cache controller to advance the state of the memory transaction (i.e., the request received in step 644).

The protocol engine is further configured to stall action on any new messages concerning the same cache line and received from other nodes, until after receiving the processing instructions from the L2 cache controller. Thus, the protocol engine performs steps 602 and 604 (FIG. 13A) on each new message concerning the same cache line, and then stalls the processing of those messages until the processing of the stale message from the L2 cache controller is resolved. After resolution of the stale message, processing of each of the new messages resumes at step 606.

In step 662 (FIG. 14B), the L2 cache controller 116 receives from the protocol engine 122, 124 the request for additional processing instructions with respect to the "stale" request. The L2 cache controller 116 responds initially by determining whether the "stale" request is inconsistent with the current state of the memory line (step 666).

If the stale request is not inconsistent with the current state of the memory line, the L2 cache controller 114 responds to the request for additional processing instructions with instructions directing the protocol engine 122, 124 to process the stale request as is (step 668).

If the stale request is inconsistent with the current state of the memory line of information 184, the L2 cache controller's 114 response depends upon the nature of the inconsistency.

There are a number of ways by which a stale request can be inconsistent with the current state of the memory line. For example, the sharing information (i.e., state information) included in the stale request may differ from the current sharing information even though the operation included in the stale request remains consistent with the state of the memory line. Thus, if the request is for exclusive ownership of the memory line, but additional nodes have become sharers since the request was sent, the operation of obtaining exclusive ownership is still valid, but the sharing information included in the stale request is not. In this instance, the L2 cache controller 116 selects instructions that direct the protocol engine 122, 124 to process the stale request with reference to up-to-date sharing information included with the additional processing instructions (step 670).

Yet another way in which a stale request is inconsistent with the current state of the memory line occurs when the L2 cache controller 116 no longer requires communication with the protocol engine 122, 124 to respond to the request received in step 610 (FIG. 14A). This occurs, for example, when the request received in step 610 is for a shared copy of a memory line that the local memory subsystem 123 stores, and the request is received when the state of this memory line indicates that another node is exclusive owner of this memory line. If, when the L2 cache controller 116 receives the request for additional processing steps, the state of this memory line no longer indicates that another node is exclusive owner of this memory line of information, the L2 cache controller 116 can satisfy the request without the help of a protocol engine 122, 124. Note that this state change can occur if, for example, the L2 cache controller received a write-back from the exclusive owner of the memory line before receiving a response to the request received in step 610. Further, a write-back terminates the sender's exclusive ownership of a given memory line and includes an up-to-date copy of the memory line. In this instance, the L2 cache controller 116 selects instructions that direct the protocol engine 122, 124 to abort the stale request (step 672). Additionally, the L2 cache controller 116 processes the request locally (step 674), including sending a response to the L1 cache 108, 110. The L2 cache controller 116 also removes the pending transaction buffer 406 entry added in step 611 (step 676).

Still another way in which a stale request is inconsistent with the current state of the memory line occurs when the operation included in the stale request is no longer consistent with the state information. This occurs, for example, when the request received in step 610 is for an exclusive copy of a memory line that the local memory subsystem 123 stores, and the request is received when the state of this memory line indicates that one or more other nodes have a shared copy of this memory line. If, when the L2 cache controller 116 receives the request for additional processing steps, the state of this memory line indicates that another node has become exclusive owner of this memory line of information, the stale request is no longer consistent with the state information and the L2 cache controller 116. In this instance, the L2 cache controller 116 selects instructions that direct the protocol engine 122, 124 to abort the stale request and take other action (FIG. 14C, step 678). Additionally, the L2 cache controller 116 sends instructions to the L1 cache 108, 110 (the original source of the request received by the L2 cache controller in step 610) that direct the L1 cache 108, 110 to abort the request (step 680). The L2 cache controller 116 also removes the pending transaction buffer 406 entry added in step 611 (step 682).

The protocol engine 122, 124 subsequently receives the processing instructions sent by the L2 cache controller 116 in steps 668, 670, 672 or 678 (step 684). The protocol engine processes these instructions and the stale request as described above (686, FIG. 13B). Again, this often includes aborting a stale request, processing a stale request as is and removing the stale designation, or processing a stale request with reference to up-to-date sharing information. If directed to abort the stale request, the protocol engine 122, 124 removes the TSRF 202 entry added in step 646. This marks the end of this memory transaction from the perspective of the protocol engine.

In many memory transactions the protocol engine 122, 124 sends a request to one or more other nodes 102, 104. For example, while processing a request from the L2 cache controller 116 the protocol engine 122, 124 will typically send a request to one or more other nodes. The protocol engine 122, 124 will, therefore, subsequently receive one or more responses from the one or more other nodes (step 688, FIG. 13B). The protocol engine 122, 124 then sends a response to the L2 cache controller 116 (step 690) and removes the TSRF entry added in step 646 (step 692). This marks the end of this memory transaction from the perspective of the protocol engine.

Upon receiving the response sent in step 690 (step 694, FIG. 14C), the L2 cache controller 116 updates the state of the memory line (step 696), sends a response to the L1 cache 108, 110 (step 698), and removes the pending transaction buffer 406 entry added in step 611 (step 699). Note that only when the protocol engine provides the response does the L2 cache controller 116 update the state of the memory line. Again, this ensures that the protocol engine 122, 124 always wins races with the L2 cache controller.

Figure 13C:
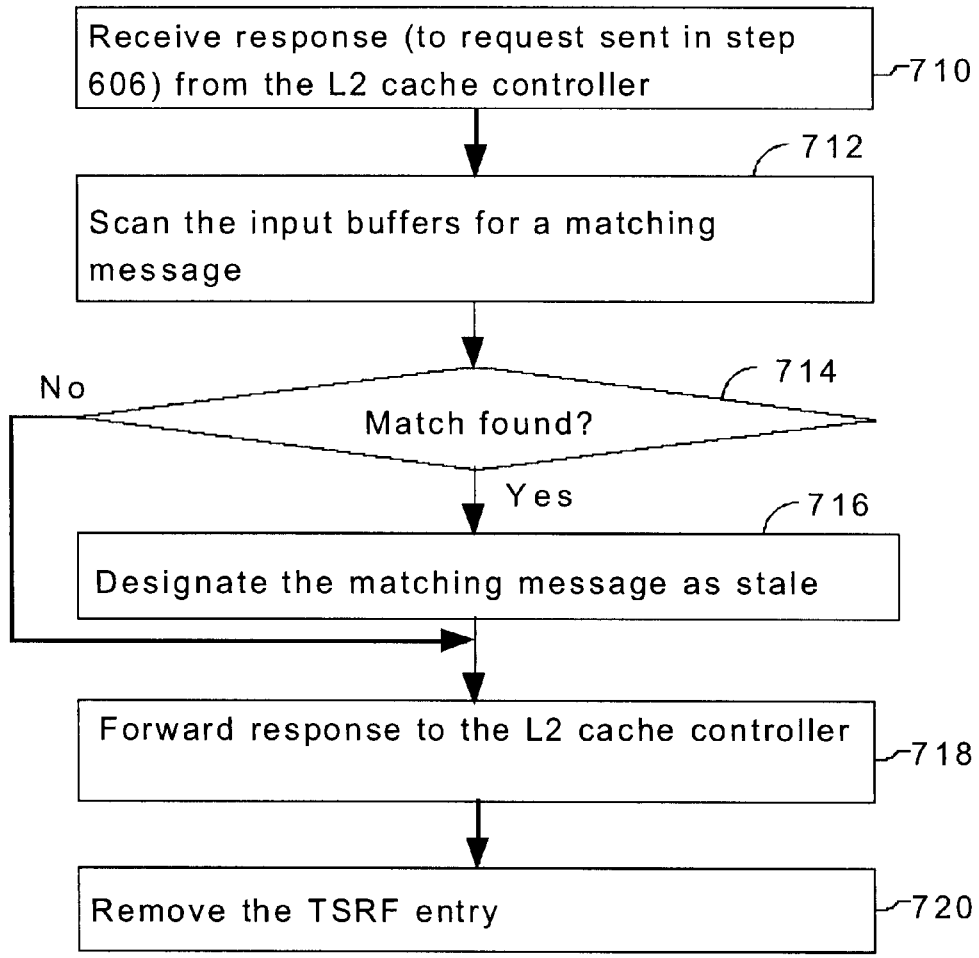

Referring to FIG. 13C, when the protocol engine receives from the L2 cache controller 116 a response to the request sent in step 606 (step 710) (i.e., selects the request from an input buffer 192 for processing), the protocol engine 122, 124 scans the input buffers 192 for a matching message (step 712). More specifically, the protocol engine 122, 124 determines if a request stored in the input buffers 192 concerns the same memory line that is the subject of the response received in step 710. Typically, the protocol engine 122, 124 makes this determination by reference to a portion of an identifier of the memory line included in the message (e.g., 9 bits of a 16 bit physical address of the memory line).

If a match is found (step 714-Yes), the protocol engine designates the request as stale (step 716). The stale designation will not be acted upon by the protocol engine 122, 124 until the request is selected from the input buffer 192 for processing as described above with reference to steps 644–660.

The protocol engine then continues processing the response received in step 710 by sending a response to the node 102, 104 that sent the request received by the protocol engine in step 602 (step 718). The protocol engine 122, 124 also removes the TSRF entry added in step 604 (step 720).

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, various steps concern updating a TSRF entry or pending transaction buffer entry at specific times. Alternate embodiments of the present invention may update these entries at other times during the processing of a transaction. Additionally, the processing steps often send a message and then update a TSRF entry or pending transaction buffer entry (e.g., steps 658 and 660). In alternate embodiments, these steps are reversed.

What is claimed is:

1. A multiprocessor computer system comprising a plurality of nodes, each node from said plurality of nodes comprising:
an interface to a local memory subsystem, the local memory subsystem storing a multiplicity of memory lines of information and a directory;
a first memory cache for caching memory lines of information, said memory lines of information including memory lines of information stored in the local memory subsystem and memory lines of information stored in a remote memory subsystem that is local to another node;
a protocol engine configured to maintain cache coherence across the plurality of nodes;
a cache controller configured to maintain cache coherence within the node;
the protocol engine configured transmit an external request concerning a memory line of information to the cache controller for processing and a response, the external request originating from another node;
the cache controller configured to transmit an internal request concerning the memory line of information to the protocol engine for processing and a response, the internal request originating from the first memory cache;
the protocol engine configured to process the transmitted internal request, if a memory transaction corresponding to the transmitted internal request and a memory transaction corresponding to the transmitted external request overlap, by
sending an instruction request to the cache controller for a set of one or more instructions concerning the transmitted internal request; and
stalling action on the transmitted internal request until after the set of one or more instructions is received.

2. The system of claim 1, wherein
the protocol engine includes a first memory transaction array, said first memory transaction array comprising one or more entries corresponding to zero or more internal requests and zero or more external requests.

3. The system of claim 2, wherein
each of said one or more entries include an identifier of a memory line of information.

4. The system of claim 3, wherein
the identifier is the physical address of the memory line of information.

5. The system of claim 2, wherein
the protocol engine is configured to add an entry associated with the transmitted external request to the first memory transaction array.

6. The system of claim 5, wherein
the protocol engine is configured to add an entry associated with the transmitted internal request to the first memory transaction array upon receiving the transmitted internal request.

7. The system of claim 6, wherein
the protocol engine is configured to
scan the first memory transaction array for the entry associated with the transmitted external request upon receiving the transmitted internal request; and
confirm a match between an identifier of the memory line of information included in the entry associated with the external request and the identifier of the memory line of information included in the entry associated with the transmitted internal request.

8. The system of claim 7, wherein
the protocol engine is configured to modify the entry associated with the transmitted internal request to reflect the match, said match establishing that the memory transaction corresponding to the transmitted internal request and the memory transaction corresponding to the transmitted external request overlap.

9. The system of claim 8, wherein
the protocol engine is configured to modify the entry associated with the transmitted internal request to require said protocol engine to execute the set of one or more instructions before taking further action on said transmitted internal request, whereby action on said transmitted internal request is stalled.

10. The system of claim 1, wherein
the protocol engine is configured to scan the transmitted internal request to determine whether said transmitted internal request indicates that the memory transaction corresponding to the transmitted internal request and the memory transaction corresponding to the transmitted external request overlap.

11. The system of claim 1, wherein
each node from the plurality of nodes further comprises an output buffer, said output buffer configured to receive the transmitted internal request and a response to the transmitted external request from the cache controller and forward said transmitted internal request and said response to the protocol engine.

12. The system of claim 11, wherein
the output buffer is configured to determine whether the memory transaction corresponding to the transmitted external request and the memory transaction corresponding to the transmitted internal request overlap.

13. The system of claim 11, wherein
the output buffer is configured to modify the transmitted internal request to indicate that the memory transaction corresponding to the transmitted external request and the memory transaction corresponding to the transmitted internal request overlap if the output buffer receives the transmitted external request from the cache controller before the response but forwards said response to the protocol engine before the transmitted internal request.

14. The system of claim 11, wherein
the output buffer includes a high priority lane, a low priority lane, and a comparator;
the high priority lane configured to store a plurality of high priority messages received from the cache controller, said plurality of high priority messages including a response to the transmitted external request;

the low priority lane configured to store a plurality of low priority message received from the cache controller, said plurality of low priority messages including the transmitted internal request; and the comparator is configured to determine whether the response when selected for transmittal from the high priority lane matches the transmitted internal request, said comparator further configured to modify said transmitted internal request to indicate that the memory transaction corresponding to the transmitted internal request and the memory transaction corresponding to the transmitted external request overlap.

15. The system of claim 14, wherein low priority lane comprises a series of low priority staging buffers, said plurality of low priority messages being individually stored in the series of low priority staging buffers and selected for transmittal in the order received from the cache controller.

16. The system of claim 14, wherein high priority lane comprises a series of high priority staging buffers, said plurality of high priority messages being individually stored in the series of high priority staging buffers and selected for transmittal in the order received from the cache controller.

17. The system of claim 14, wherein the comparator is configured to compare an identifier of a memory line of information included in a high priority message from the plurality of high priority messages to an identifier of a memory line of information included in a low priority message included in the plurality of low priority messages.

18. The system of claim 17, wherein the identifier of the memory line of information included in the high priority message and the identifier of the memory line of information included in the low priority message included in the plurality of low priority messages are each a physical memory address of the respective memory lines of information.

19. The system of claim 14, wherein said output buffer is configured to select an available high priority message from the high priority lane over an available low priority message from the low priority lane for forwarding to the protocol engine.

20. The system of claim 14, wherein the output buffer is configured to modify the transmitted internal request to indicate that the memory transaction corresponding to said transmitted internal request and the memory transaction corresponding to the transmitted external request overlap by setting one or more bits of said transmitted internal request.

21. The system of claim 14, wherein the output buffer is an integrated element of the cache controller.

22. The system of claim 21, wherein the transmitted internal request originates from the first memory cache.

23. The system of claim 11, wherein each node from the plurality of nodes further comprises an input buffer, said input buffer configured to receive the transmitted internal request and the response to the transmitted external request from the output buffer, said protocol engine configured to access said input buffer to process said transmitted internal request and to process said response to the transmitted external request.

24. The system of claim 23, wherein the protocol engine is configured to mark the transmitted internal request as stale to indicate that the memory transaction corresponding to the transmitted internal request and the memory transaction corresponding to the response to the transmitted external request overlap if the protocol engine extracts the response to the transmitted external request from the input buffer before the transmitted internal request when the transmitted internal request is received by the input buffer before the response to the transmitted external request.

25. The system of claim 23, wherein the input buffer comprises a set of high priority buffers and a set of low priority buffers;

the set of high priority buffers configured to store a plurality of high priority messages received from the output buffer, said plurality of high priority messages including the response to the transmitted external request; and the set of low priority buffers configured to store a plurality of low priority messages received from the output buffer, said plurality of low priority messages including the transmitted internal request.

26. The system of claim 25, wherein the protocol engine compares an identifier of a memory line of information included in a high priority message stored in said input buffer to an identifier of a memory line of information included in a low priority message stored in said input buffer upon extracting said high priority message from said input buffer to determine if a memory transaction corresponding to the high priority message and a memory transaction corresponding to the low priority message overlap.

27. The system of claim 26, wherein the identifier is comprised of a plurality of bits; and the match is limited to a subset of the plurality of bits.

28. The system of claim 25, wherein the protocol engine is configured to select a high priority message from the set of high priority buffers over a low priority message from the set of low priority buffers when extracting a message from said input buffer.

29. The system of claim 25, wherein the protocol engine is configured to modify a low priority buffer from the set of low priority input buffers that stores the transmitted internal request to indicate that the memory transaction corresponding to the response to the transmitted external request and the memory transaction corresponding to the transmitted internal request overlap if the protocol engine extracts the response to the transmitted external request from the input buffer before the transmitted internal request when the transmitted internal request is received by the input buffer before the response to the transmitted external request.

30. The system of claim 23, wherein the input buffer is an integrated element of the protocol engine.

31. The system of claim 1, wherein the memory transaction corresponding to the transmitted internal request and the memory transaction corresponding to the transmitted external request overlap if the transmitted internal request is received before a response to the transmitted external request.

32. The system of claim 1, wherein the cache controller is configured to update the directory upon processing the transmitted external request, said directory subsequently reflecting a state of the memory line of information consistent with the transmitted external request.

33. The system of claim 1, wherein the cache controller is configured to respond to the instruction request by determining a consistency of the transmitted internal request with a state of the memory line of information, said state of said memory line of information stored in the directory, said consistency guiding the selection of the set of one or more instructions.

34. The system of claim 33, wherein the transmitted internal request is not consistent with the state of the memory line of information if the transmitted internal request is for a shared or exclusive copy of the memory line of information and said state of said memory line of information indicates that the memory line of information is not exclusively owned or shared by another node, said set of one or more instructions directing the protocol engine to abort the transmitted internal request.

35. The system of claim 33, wherein the transmitted internal request is not consistent with the state of the memory line of information if the transmitted internal request is for exclusive ownership of the memory line of information and said state of said memory line of information indicates that the memory line of information is exclusively owned by another node, said set of one or more instructions directing the protocol engine to abort the transmitted internal request.

36. The system of claim 33, wherein the internal request type is not consistent with the state of the memory line of information if the state of the memory line of information indicates that a different set of one or more nodes may be sharing or exclusively owning the memory line of information then when the cache controller transmitted the transmitted internal request, said set of one or more instructions including up-to-date sharing information extracted from said state of said memory line of information and directing the protocol engine to execute that transmitted internal request with reference to said up-to-date sharing information.

37. The system of claim 1, wherein the cache controller is configured to not update the directory with respect to the transmitted internal request until after receiving from the protocol engine a response to the transmitted internal request.

38. The system of claim 1, wherein the protocol engine is configured to defer action on an additional external request concerning the memory line of information until after the set of one or more instructions is executed.

39. The system of claim 38, wherein the protocol engine is configured to add an entry to a first memory transaction array concerning the additional external request, said first memory transaction array comprising one or more entries corresponding to zero or more internal requests and zero or more external requests.

40. The system of claim 38, wherein the protocol engine is configured to
scan the first memory transaction array for the entry associated with the transmitted internal request; and
confirm a match between an identifier of the memory line of information included in the entry associated with the transmitted internal request and the identifier of the memory line of information included in the entry associated with the additional external request.

41. The system of claim 40, wherein deferring action on the additional external request includes modifying the entry associated with the additional external request to indicate the set of one or more instructions must be executed before continuing progress on the additional external request, whereby the additional external request is stalled.

* * * * *